US012070950B2

(12) United States Patent
Nakagawa et al.

(10) Patent No.: US 12,070,950 B2
(45) Date of Patent: *Aug. 27, 2024

(54) LIQUID EJECTING APPARATUS AND CLEANING DEVICE

(71) Applicant: SEIKO EPSON CORPORATION, Tokyo (JP)

(72) Inventors: Shigenori Nakagawa, Kamilina-gun (JP); Keiji Matsumoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/313,196

(22) Filed: May 5, 2023

(65) Prior Publication Data

US 2023/0271420 A1 Aug. 31, 2023

Related U.S. Application Data

(63) Continuation of application No. 17/331,224, filed on May 26, 2021, now Pat. No. 11,679,590, which is a (Continued)

(30) Foreign Application Priority Data

Oct. 5, 2015 (JP) ................................ 2015-197401

(51) Int. Cl.
*B41J 2/165* (2006.01)

(52) U.S. Cl.
CPC ....... *B41J 2/16535* (2013.01); *B41J 2/16538* (2013.01); *B41J 2/16508* (2013.01);
(Continued)

(58) Field of Classification Search
CPC ......................... B41J 2/16535; B41J 2/16538; B41J 2/16508; B41J 2002/1655; B41J 2002/16558
See application file for complete search history.

(56) References Cited

U.S. PATENT DOCUMENTS 10,766,262 B2 9/2020 Nakagawa
11,679,590 B2 * 6/2023 Nakagawa ........... B41J 2/16535 347/33

(Continued)

FOREIGN PATENT DOCUMENTS

JP H10-44446 2/1998
JP 2000-108375 4/2000

(Continued)

*Primary Examiner* — Sharon Polk
(74) *Attorney, Agent, or Firm* — WORKMAN NYDEGGER

(57) ABSTRACT

A liquid ejecting apparatus includes a liquid ejecting head which ejects liquid from a nozzle that is disposed on a nozzle surface, a first wiping portion which is able to wipe away the liquid that is adhered to the nozzle surface, and a second wiping portion which is able to hold the liquid that is adhered to the nozzle surface by contacting the nozzle surface, wherein it is possible to perform a first maintenance operation in which the nozzle surface is wiped using the first wiping portion and a second maintenance operation in which the second wiping portion is caused to contact the nozzle surface due to the second wiping portion being biased by the first wiping portion.

5 Claims, 13 Drawing Sheets

Related U.S. Application Data continuation of application No. 16/795,368, filed on Feb. 19, 2020, now Pat. No. 11,052,661, which is a continuation of application No. 16/419,269, filed on May 22, 2019, now Pat. No. 10,766,262, which is a continuation of application No. 15/860,448, filed on Jan. 2, 2018, now Pat. No. 10,357,973, which is a continuation of application No. 15/285,293, filed on Oct. 4, 2016, now Pat. No. 9,889,669.

(52) U.S. Cl.
CPC .................. *B41J 2002/1655* (2013.01); *B41J 2002/16558* (2013.01)

(56) References Cited

U.S. PATENT DOCUMENTS

| | | | |
|---|---|---|---|
| 2008/0012896 | A1 | 1/2008 | Murayama |
| 2010/0245462 | A1 | 9/2010 | Seino et al. |
| 2012/0050394 | A1 | 3/2012 | Takada |
| 2013/0026536 | A1 | 1/2013 | Corona et al. |
| 2013/0076826 | A1 | 3/2013 | Nukui |
| 2014/0125734 | A1 | 5/2014 | Kobayashi |
| 2016/0046128 | A1 | 2/2016 | Tanda |
| 2016/0152031 | A1 | 6/2016 | Somete |
| 2017/0096008 | A1 | 4/2017 | Nakagawa et al. |
| 2018/0126737 | A1 | 5/2018 | Asano |

FOREIGN PATENT DOCUMENTS

| | | | |
|---|---|---|---|
| JP | 2008-302562 | | 12/2008 |
| JP | 2009-023106 | | 2/2009 |
| JP | 2009-286077 | | 12/2009 |
| JP | 2010-201796 | | 9/2010 |
| JP | 2011-079170 | | 4/2011 |
| JP | 2011-110782 | | 6/2011 |
| JP | 2011-136466 | A | 7/2011 |
| JP | 2011-148173 | | 8/2011 |
| JP | 2012-206366 | | 10/2012 |
| JP | 2014-091319 | | 5/2017 |
| JP | 2014-100799 | | 6/2017 |
| JP | 6606958 | | 11/2019 |
| WO | 2014-129010 | | 8/2014 |

* cited by examiner

LIQUID EJECTING APPARATUS AND CLEANING DEVICE

BACKGROUND

1. Technical Field

The present invention relates to a liquid ejecting apparatus such as an ink jet printer, and a cleaning device.

2. Related Art

From the related art, as a type of liquid ejecting apparatus, an ink jet printer is known which records images by discharging an ink droplet from a nozzle, which is formed on a nozzle surface of an ink jet recording head, onto a recording medium. In such a printer, a wiping member with a cord shape for wiping the nozzle surface may be provided (for example, refer to JP-A-2008-302562).

The wiping member is disposed in a state where a predetermined tension is applied such that a part of the wiping member is bridged over a unwinding portion and a winding portion which are disposed on both sides that interpose the ink jet recording head. That is, the wiping member is wound around the unwinding portion and is wound by the winding portion by being unwound from the unwinding portion. Then, ink and the like which is adhered to the nozzle surface is wiped away using the wiping member due to the wiping member being moved in a direction orthogonal to the direction in which the wiping member is bridged over the unwinding portion and the winding portion in a state of contacting the nozzle surface.

However, in the printer described above, pressing force of the wiping member to the nozzle surface when wiping the nozzle surface using the wiping member is not uniform since the pressing force depends on the tension which is applied to the wiping member. For this reason, there is a problem in that there is a concern that the nozzle surface is not stably wiped using the wiping member and wiping remains are generated on the nozzle surface due to the wiping member.

Note that, such a problem is not limited to an ink jet printer which records an image by discharging an ink droplet from a nozzle, but is generally common in liquid ejecting apparatuses in which liquid adhered to a nozzle surface is wiped away while pressing a wiping member against a nozzle surface on which a nozzle is disposed.

SUMMARY

An advantage of some aspects of the invention is to provide a liquid ejecting apparatus and a cleaning device which are able to stably wipe a nozzle surface on which a nozzle that ejects liquid is disposed.

Hereinafter, means of the invention and operation effects thereof will be described.

According to an aspect of the invention, there is provided a liquid ejecting apparatus including a liquid ejecting head which ejects liquid from a nozzle that is disposed on a nozzle surface, a first wiping portion which is able to wipe away the liquid that is adhered to the nozzle surface, and a second wiping portion which is able to hold the liquid that is adhered to the nozzle surface by contacting the nozzle surface, in which it is possible to perform a first maintenance operation in which the nozzle surface is wiped using the first wiping portion, and a second maintenance operation in which the second wiping portion is caused to contact the nozzle surface due to the second wiping portion being biased by the first wiping portion.

According to this configuration, it is possible to cause the second wiping portion to stably contact the nozzle surface due to the second maintenance operation, in particular, being selectively performed. Accordingly, it is possible to stably wipe the nozzle surface on which the nozzle that ejects liquid is disposed.

In the liquid ejecting apparatus, it is preferable that it is possible to perform a third maintenance operation in which the second wiping portion is caused to contact the nozzle surface without the second wiping portion being biased by the first wiping portion.

According to this configuration, it is possible to perform wiping of the nozzle surface where damage to the nozzle surface is suppressed.

In the liquid ejecting apparatus, it is preferable that cleaning of the first wiping portion is performed by the second wiping portion being caused to contact the first wiping portion.

According to this configuration, it is possible for the second wiping portion to also be used as a cleaner for the first wiping portion.

In the liquid ejecting apparatus, it is preferable that the first wiping portion is configured by a wiping member which has flexibility and the second wiping portion is configured by an absorption member with a lengthwise shape which is able to absorb the liquid.

According to this configuration, it is possible for the liquid that is adhered to the nozzle surface to be scraped away using the wiping member or to be absorbed using the absorption member.

In the liquid ejecting apparatus, it is preferable that the second wiping portion is caused to vibrate or rotate in the maintenance operation in which the nozzle surface is wiped using the second wiping portion.

According to this configuration, it is possible to improve a wiping property using the second wiping portion.

According to another aspect of the invention, there is provided a cleaning device including a first wiping portion which is able to wipe away liquid that is adhered to a nozzle surface of a liquid ejecting head which ejects the liquid from a nozzle that is disposed on the nozzle surface, and a second wiping portion which is able to hold the liquid that is adhered to the nozzle surface by contacting the nozzle surface, in which it is possible to perform a first maintenance operation in which the nozzle surface is wiped using the first wiping portion, and a second maintenance operation in which the second wiping portion is caused to contact the nozzle surface due to the second wiping portion being biased by the first wiping portion.

According to this configuration, it is possible to cause the second wiping portion to stably contact the nozzle surface due to the second maintenance operation, in particular, being selectively performed. Accordingly, it is possible to stably wipe the nozzle surface on which the nozzle that ejects liquid is disposed.

BRIEF DESCRIPTION OF THE DRAWINGS

The invention will be described with reference to the accompanying drawings, wherein like numbers reference like elements.

DESCRIPTION OF EXEMPLARY EMBODIMENTS

A first embodiment of a liquid ejecting apparatus is described below with reference to the accompanying drawings.

Figure 1:
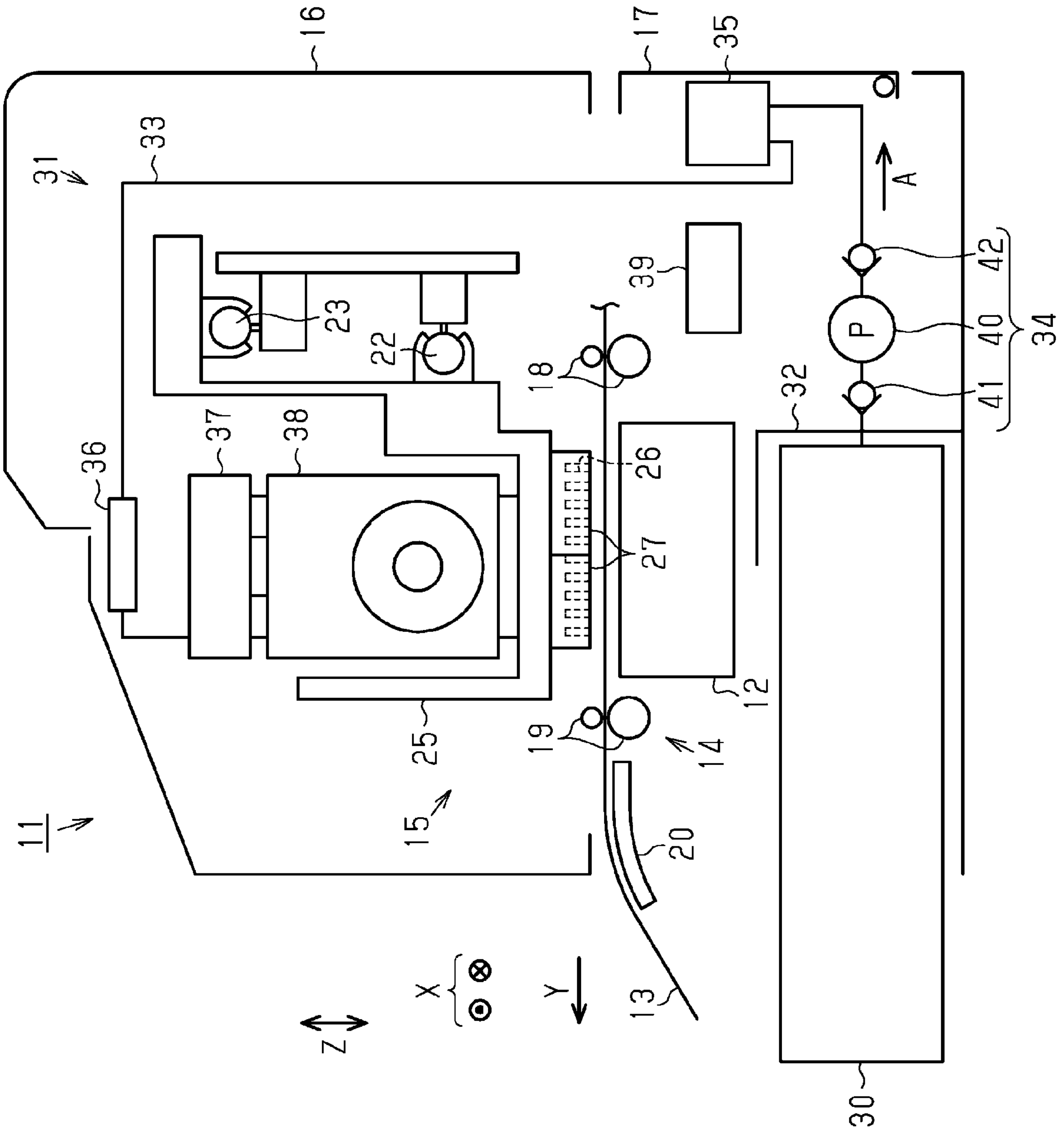
FIG. 1 is a schematic view illustrating a schematic configuration of an ink jet printer of a first embodiment.

As shown in FIG. 1, an ink jet printer 11 as an example of the liquid ejecting apparatus is provided with a transport portion 14 which transports a recording medium 13 such as a paper sheet that is supported on a support base 12 in a transport direction Y along a front surface of the support base 12 and a printing portion 15 which performs printing by ejecting ink, as an example of liquid, on the transported recording medium 13.

The support base 12, the transport portion 14, and the printing portion 15 are assembled on a printer main body 16 which is configured by a housing, a frame, and the like. In the ink jet printer 11, the support base 12 extends in a width direction of the recording medium 13 (direction orthogonal to a paper surface in FIG. 1). In addition, a cover 17 is attached to the printer main body 16 so as to be able to be opened and closed.

The transport portion 14 is provided with a pair of transport rollers 18 and 19 which are respectively disposed on an upstream side and a downstream side of the support base 12 in the transport direction Y and a guide plate 20 which guides while supporting the recording medium 13 by being disposed on the downstream side of the transport roller 19 in the transport direction Y. Then, the transport portion 14 transports the recording medium 13 in the transport direction Y along the front surface of the support base 12 and the front surface of the guide plate 20 by rotating while interposing the recording medium 13 by the pair of transport rollers 18 and 19 being driven by a transport motor (illustration omitted).

The printing portion 15 is provided with guide shafts 22 and 23 which extend along a scanning direction X that is a width direction of the recording medium 13 which is orthogonal to (intersects with) the transport direction Y of the recording medium 13 and a carriage 25 that is able to reciprocally move in the scanning direction X by being guided on the guide shafts 22 and 23. The carriage 25 reciprocally moves in the scanning direction X accompanying driving of a carriage motor 24 (refer to FIG. 2).

At least one (two in the embodiment) liquid ejecting head 27 that has the nozzle 26 which ejects ink is attached to a lower end portion of the carriage 25. That is, the liquid ejecting head 27 is attached to the carriage 25 at a posture with a lower surface placed facing a predetermined gap to the support base 12 in a vertical direction Z, and is reciprocally moved in the scanning direction X along with the carriage 25 accompanying driving of the carriage motor 24 (refer to FIG. 2). Each liquid ejecting head 27 is separated by a predetermined distance in the scanning direction X, and disposed so as to be deviated by a predetermined distance in the transport direction Y.

Meanwhile, a part of a supply mechanism 31 which supplies ink to the liquid ejecting head 27 from an ink cartridge 30 is attached to the upper side of the carriage 25. The supply mechanism 31 causes ink to flow along a supply direction A from the upstream side which is the ink cartridge 30 side toward the downstream side which is the liquid ejecting head 27 side. The ink cartridge 30 and the supply mechanism 31 are provided with at least one set (five sets in the embodiment) of each type of ink.

Five ink cartridges 30 are respectively mounted so as to freely attach and detach a plurality (five in the embodiment) of mounting portions 32, and accommodate respectively different colors (types) of ink. For example, each color of ink of cyan (C), magenta (M), yellow (Y), black (K), and white (W) are accommodated in each ink cartridge 30. Color printing and the like is performed on the recording medium 13 by ejecting ink which is supplied from each ink cartridge 30 from the liquid ejecting head 27. For example, in a case of a dark color recording medium 13, color printing is performed thereon after white printing (foundation printing) is performed.

The supply mechanism 31 is provided with a supply path 33 which supplies ink to the liquid ejecting head 27 from the ink cartridge 30. A supply pump 34 which causes ink to flow in the supply direction A, a filter unit 35 which captures air bubbles or foreign matter within ink, a static mixer 36 which stirs ink by changing flow of ink which flows along the supply path 33, a liquid retaining chamber 37 which retains ink, and a pressure adjustment unit 38 which adjusts ink pressure are provided in order from the upstream side on the supply path 33.

The supply pump 34 has a diaphragm pump 40 in which a pump chamber capacity is variable, an inlet valve 41 which is disposed further on the upstream side than the diaphragm pump 40, and a discharge valve 42 which is disposed further on the downstream side than the diaphragm pump 40. The inlet valve 41 and the discharge valve 42 permit ink flow to the downstream side, and are configured by a one direction valve which prohibits ink flow to the upstream side.

For this reason, the supply pump 34 suctions ink via the inlet valve 41 from the ink cartridge 30 side accompanying an increase in capacity of the pump chamber of the diaphragm pump 40 and discharges ink via the discharge valve 42 to the liquid ejecting head 27 accompanying a reduction of capacity of the pump chamber. In addition, the filter unit 35 is disposed at a position which corresponds to the cover 17 of the printer main body 16, and is mounted so as to be attachable and detachable with respect to the supply path 33. Then, the filter unit 35 is replaceable by opening the cover 17.

Note that, the ink jet printer 11 is provided with a control portion 39 which performs driving control of a transport motor (illustration omitted) which drives the pair of transport rollers 18 and 19, the carriage motor 24 (refer to FIG. 2), the supply pump 34, and the like, ejection control of ink from each nozzle 26 of the liquid ejecting head 27, and the like. Then, the liquid ejecting head 27 performs printing by ejecting ink on the recording medium 13 which is transported on the support base 12 from each nozzle 26 while reciprocally moving in the scanning direction X along with the carriage 25 accompanying driving of the carriage motor 24.

Figure 2:
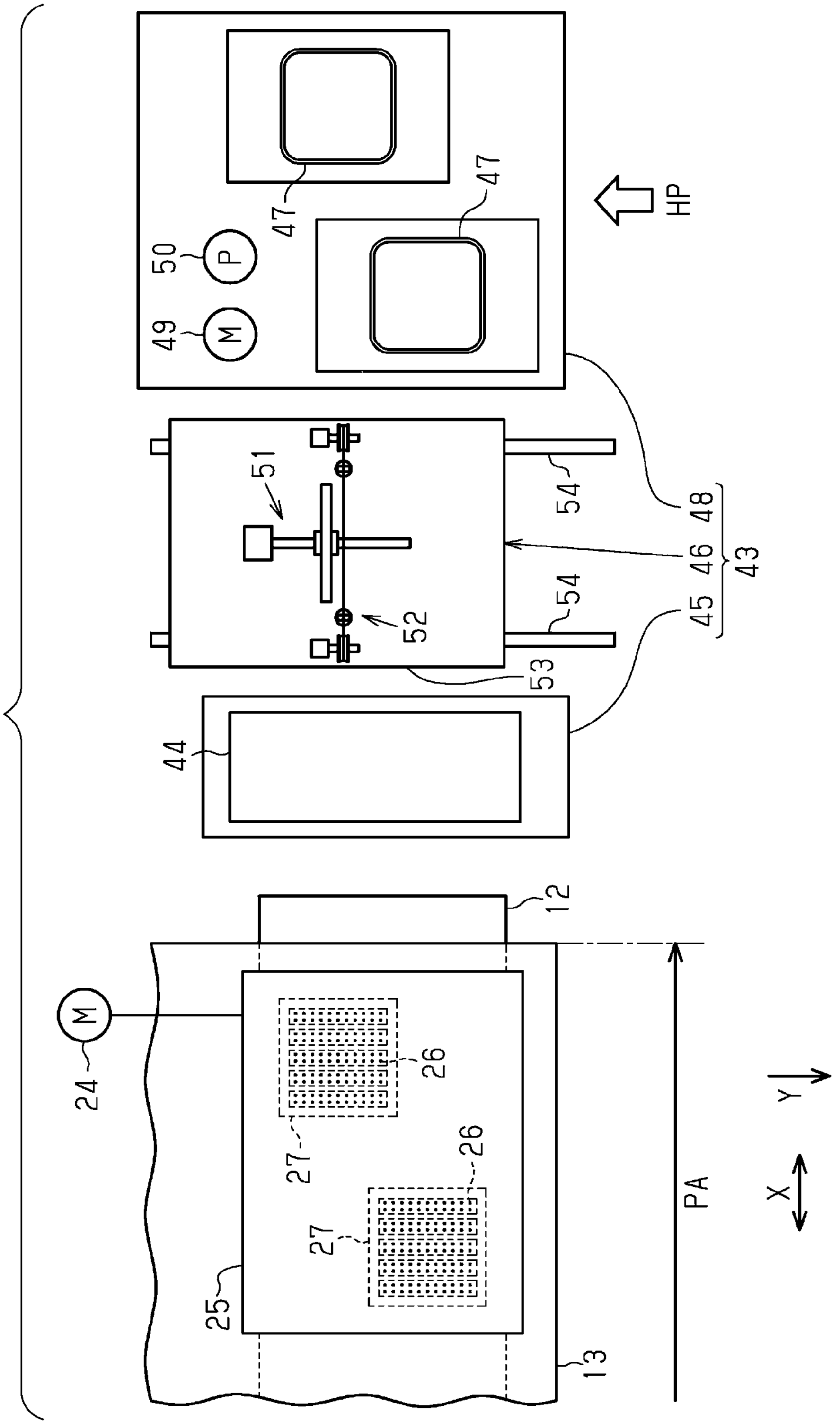
FIG. 2 is a schematic plan view illustrating a positional relationship of a support base and a maintenance mechanism.

As shown in FIG. 2, the maintenance mechanism 43 for performing maintenance of the liquid ejecting head 27 is provided at a position adjacent to one end of the support base 12 in the scanning direction X. In the embodiment, a region in which there is a possibility that the recording medium 13 is transported that is a region in which ink is ejected on the recording medium 13 in order for the liquid ejecting head 27 to print is a transport region PA. In this case, the maintenance mechanism 43 is disposed outside (right side in FIG. 2) of the transport region PA that is within a scanning range of the carriage 25 in the scanning direction X.

The maintenance mechanism 43 is provided with a flushing unit 45 that has a liquid receiving portion 44, a wiper unit 46 as an example of the cleaning device, and a capping unit 48 that has two cap portions 47 that have a bottomed rectangular box shape in which the upper end is open, disposed lined up in order from a position that is close to the transport region PA in the scanning direction X.

The carriage 25 and the liquid ejecting head 27 are in standby at a home position HP at which the capping unit 48 is disposed when printing is not performed, when the power is turned off, or the like. That is, the liquid ejecting head 27 is movable between the transport region PA and the home position HP in the scanning direction X which is orthogonal to (intersects with) the transport direction Y.

When two liquid ejecting heads 27 are moved to the home position HP, two cap portions 47 respectively face two liquid ejecting heads 27 in an up and down direction. Each cap portion 47 is raised and lowered between a position at which it is possible to contact each liquid ejecting head 27 and a position which is separated from each liquid ejecting head 27 by driving of a capping motor 49.

Each cap portion 47 suppresses drying of ink within each nozzle 26 by performing capping which forms a closed space at each liquid ejecting head 27 by contacting each liquid ejecting head 27 so as to surround a plurality of nozzles 26. Each liquid ejecting head 27 is capped by each cap portion 47 at the home position HP when printing is not performed and the like.

Within each cap portion 47, it is possible to suction using a suction pump 50 via a suction tube (illustration omitted) to which one end side is connected to each cap portion 47. Then, in a state in which each liquid ejecting head 27 is capped by each cap portion 47 at the home position HP, thickening of ink, air bubbles, and the like within each liquid ejecting head 27 are discharged within each cap portion 47 from each nozzle 26, so-called head cleaning is performed by suctioning within each cap portion 47 (closed space) by driving the suction pump 50. Note that, the capping motor 49 and the suction pump 50 are driven and controlled by the control portion 39 (refer to FIG. 1).

The wiper unit 46 is provided with a first wiping mechanism 51 which is able to wipe ink that is adhered to the lower surface of the liquid ejecting head 27, a second wiping mechanism 52 which is able to hold ink which is adhered to the lower surface by contacting the lower surface of the liquid ejecting head 27, and a base member 53 with a rectangular shape which supports the first wiping mechanism 51 and the second wiping mechanism 52. The wiper unit 46 is guided to be able to be reciprocally moved along the transport direction Y using a pair of rail portions 54.

In addition, the flushing unit 45 discharges an ink droplet from each nozzle 26 unrelated to printing with the object of preventing or eliminating clogging or the like in each nozzle 26, and receives flushing ink which is discharged when so-called flushing is performed in a liquid receiving portion 44. Note that, the flushing unit 45 is disposed so as to be positioned below the liquid ejecting head 27 at the left side at which the liquid receiving portion 44 is in FIG. 2 when the liquid ejecting head 27 on the right side in FIG. 2 is positioned above the wiper unit 46.

Figure 3:
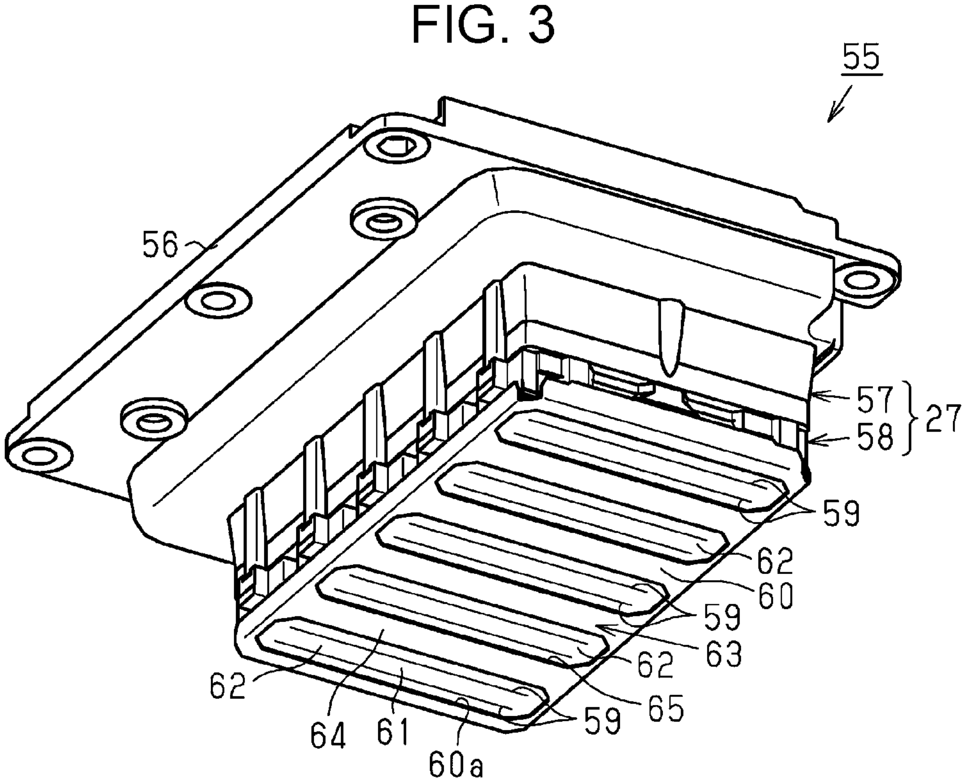
FIG. 3 is a perspective view of a head unit.

As shown in FIG. 3, since the head unit 55 is attached to a lower surface portion of the carriage 25, the head unit 55 is provided with a bracket portion 56 for attaching to the carriage 25 and the liquid ejecting head 27 with a rectangular cube shape which protrudes down from the bracket portion 56. The liquid ejecting head 27 is provided with a flow path forming portion 57 with a rectangular cube shape which protrudes down from the bracket portion 56 and a head main body 58 with a rectangular shape which is fixed to the lower side of the flow path forming portion 57. A plurality of rows (for example, 10 rows) of nozzle rows 59 are formed on the lower surface of the head main body 58 in FIG. 3.

In addition, a cover member 60 with a plate shape that has a plurality of (for example, five) through holes 60*a* is attached to the lower surface side of the head main body 58 so as to cover a portion of a nozzle opening surface 61 (lower surface in the present example) to which each nozzle 26 (refer to FIG. 4) that configures the nozzle row 59 is open. The plurality of nozzle rows 59 are exposed by a predetermined row number (for example, two rows) in one through hole 60*a*.

In the present example, a region which is exposed by the through hole 60*a* on the nozzle opening surface 61 is a nozzle peripheral region 62. That is, a surface of the nozzle 26 on the liquid ejecting head 27 is covered by the cover member 60 that has the through hole 60*a* that exposes the nozzle peripheral region 62 in a part that corresponds to the nozzle peripheral region 62. Note that, the opening region of each nozzle 26 (refer to FIG. 4) is included in the nozzle peripheral region 62.

Figure 4:
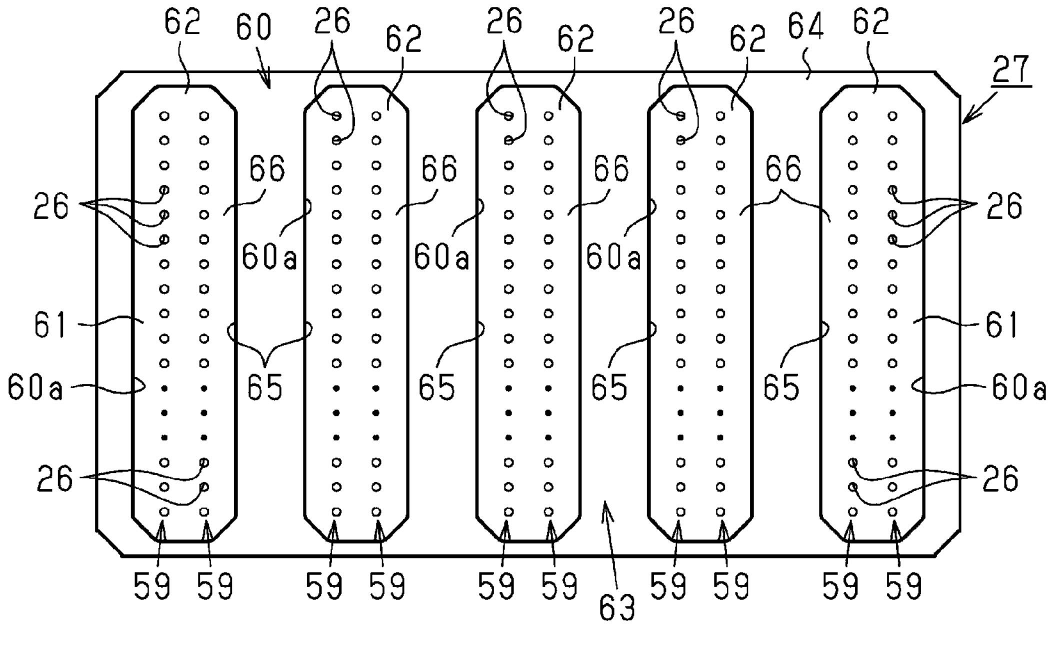
FIG. 4 is a schematic view of a nozzle surface.
Figure 5:
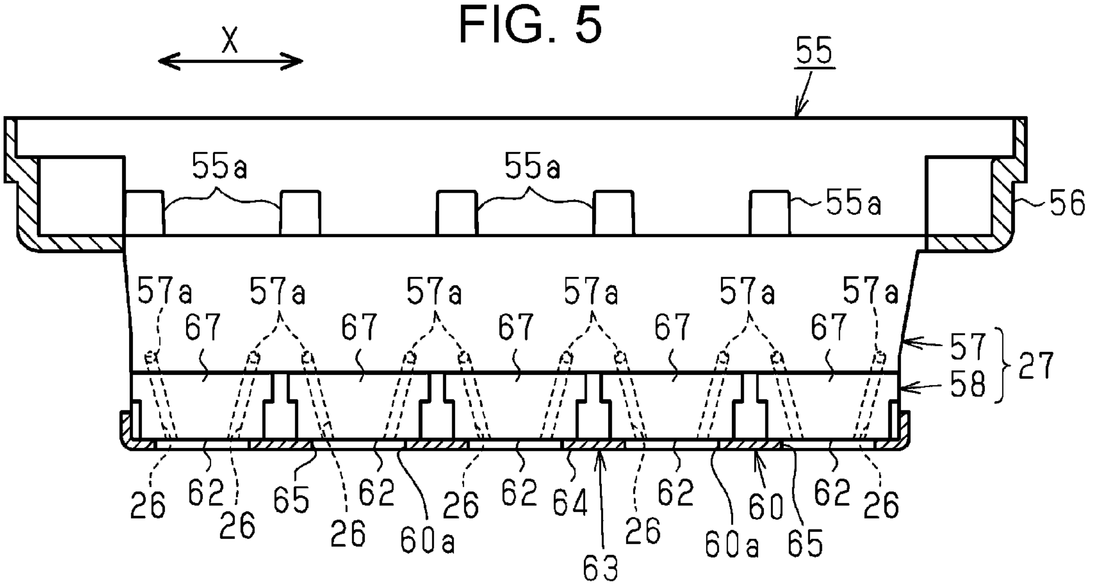
FIG. 5 is a schematic sectional view of FIG. 3.

As shown in FIGS. 4 and 5, the cover member 60 is fixed to the liquid ejecting head 27 by a fixing structure such as a lock in a state in which the cover member 60 covers a part other than the nozzle peripheral region 62 which is exposed by the through hole 60*a* on the nozzle opening surface 61. Then, as shown in FIG. 3, the entire bottom surface of the liquid ejecting head 27 is a nozzle surface 63 that is a wiping target of the wiper unit 46. The nozzle surface 63 is provided with the nozzle peripheral region 62 (that is, a region within the through hole 60*a*), and a protrusion surface 64 which is a non-nozzle region that is a region other than the nozzle peripheral region 62 and protrudes more than the nozzle peripheral region 62 by only a thickness (0.1 mm in the present example) of the cover member 60.

Accordingly, a step 65 is present between the nozzle peripheral region 62 and the protrusion surface 64 (non-nozzle peripheral region). That is, the nozzle surface 63 is configured by an uneven surface which is a concave portion at a part of the nozzle peripheral region 62 and a convex portion at a part of the protrusion surface 64. Note that, the cover member 60 is configured by, for example, metal (for example, stainless steel or the like) and the like.

As shown in FIG. 4, the nozzle row 59 is formed of multiple (for example, 180 or 360) nozzles 26 which are disposed at a constant pitch along the transport direction Y. Each nozzle row 59 respectively ejects ink of one color which corresponds to the ink color of the ink cartridge 30 (refer to FIG. 1). Of course, ink of a color other than the four colors of CMYK, and white (W) may be ejected, and for example, ink of a color such as light magenta, light cyan, light yellow, gray, and orange may be ejected. In addition, the color number of the liquid ejecting head 27 may be four colors of CMYK, three colors of CMY, one color of black, and the like. Furthermore, there may be unused nozzle rows which do not eject ink within the plurality of nozzle rows 59.

In addition, a liquid repelling treatment in which ink is easily repelled (ink repellent treatment) is carried out on the nozzle opening surface 61 and a liquid repellent film 66 (ink repellent film) is deposited on the front surface of the nozzle opening surface 61. The liquid repellent film 66 may be configured from a thin film under layer that has, for example, a polyorganosiloxane containing an alkyl group as a main material and a liquid repellent film layer that is formed of a metal alkoxide that has a long-chain polymer group containing fluorine. Ink that is used in the embodiment is, for example, pigment ink. In the pigment ink, particles of multiple pigments are dispersed within the liquid that is used as a dispersion medium. Organic pigments with an average particle diameter of approximately 100 nm as the pigments of cyan, magenta, and yellow, carbon black (inorganic pigments) with average particle diameter of approximately 120 nm as the black pigment, titanium oxide (inorganic pigments) with average particle diameter of approximately 320 nm as the white pigment, and the like may be used.

Ink in the present example is water-based ink, and particles of multiple pigments are dispersed within water that is the dispersion medium. For this reason, in the example, the liquid repellent film 66 is a water repellent film having a function to repel water-based ink. The liquid repellent film 66 may be configured from a thin film under layer that has, for example, a polyorganosiloxane containing an alkyl group as a main material and a liquid repellent film layer that is formed of a metal alkoxide that has a long-chain polymer group containing fluorine. The liquid repellent film 66 is gradually worn due to wiping with respect to the nozzle opening surface 61 being repeatedly performed, and when the liquid repellent film 66 is worn by a certain amount or more, liquid repellence is lowered. Note that, the liquid repellent film 66 may be a liquid-repellent coating film and may be a monomolecular film with liquid repellence, and it is possible to arbitrarily select the film thickness and liquid repellent treatment method thereof.

In a state in which liquid repellence of the liquid repellent film 66 is lowered, a wetting angle (contact angle) of liquid such as ink mist is reduced in the nozzle peripheral region 62. For this reason, a plurality of ink mists which are adhered in the nozzle peripheral region 62 tend to spread and one ink droplet (adhered ink) develops relatively widely. For this reason, there is a concern that such adhered ink is present in the vicinity of the nozzle 26, an opening of a part of the nozzles 26 is blocked, and furthermore, flows within the nozzle 26.

In addition, when the ink droplet is ejected from the nozzle 26 in a state in which the adhered ink is present in the vicinity of the nozzle 26, the ejected ink droplet contacts the adhered ink, and curved flight of the ink droplet is caused. Such curved flight of the ink droplet leads to lowering of printing quality caused by deviation of a landing position (that is, printing dot formation position) of the ink droplet on the recording medium 13 from an assumed position. As a result, it is necessary to suppress as much as possible wear on the liquid repellent film 66 due to wiping.

Meanwhile, the cover member 60 is manufactured such that a metal plate is processed in a predetermined shape, and liquid repellent treatment is not carried out on the front surface of the cover member 60. For this reason, the protrusion surface 64 (non-nozzle peripheral region) has a lower liquid repellence than the nozzle peripheral region 62. That is, a wetting angle of ink with respect to the protrusion surface 64 is smaller than a wetting angle of ink with respect to the nozzle peripheral region 62.

As shown in FIG. 5, the liquid ejecting head 27 has a plurality (for example five in the embodiment) of recording heads 67 (unit heads) that are arranged in parallel at a constant pitch in the scanning direction X. A peripheral edge portion of the nozzle opening surface 61 which is the lower surface of the recording head 67 is covered by the cover member 60, and the nozzle peripheral region 62 which includes two rows of nozzles 26 is exposed from the through hole 60*a* that is bored in the cover member 60.

Each nozzle 26 is linked to each ink flow path 57*a* which passes within the flow path forming portion 57, and each ink flow path 57*a* is linked to a plurality of supply pipe portions 55*a* which protrude upward from the upper surface of the flow path forming portion 57 through which a flow path that is not illustrated passes. Each supply pipe portion 55*a* is linked to a supply opening of the pressure adjustment unit 38 (refer to FIG. 1) that is mounted on the carriage 25 via the flow path that is not illustrated.

Accordingly, from each pressure adjustment unit 38 (refer to FIG. 1), ink of each corresponding color is supplied to the nozzle 26 of the corresponding recording head 67 through each supply pipe portion 55*a*, each ink flow path 57*a*, and the like. Note that, the liquid ejecting head 27 may be configured from one head which has a nozzle row of three or more rows.

Next, the configuration of the wiper unit 46 will be described in detail.

Figure 6:
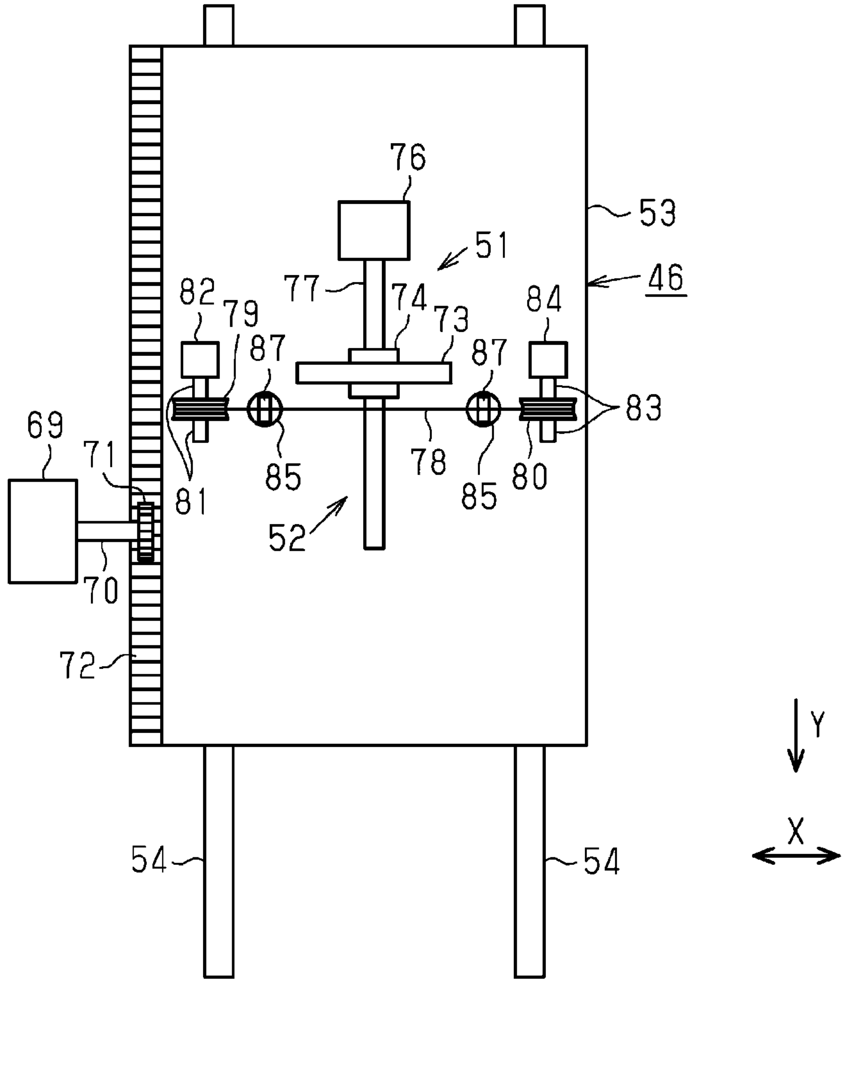
FIG. 6 is a schematic plan view of a wiper unit.
Figure 7:
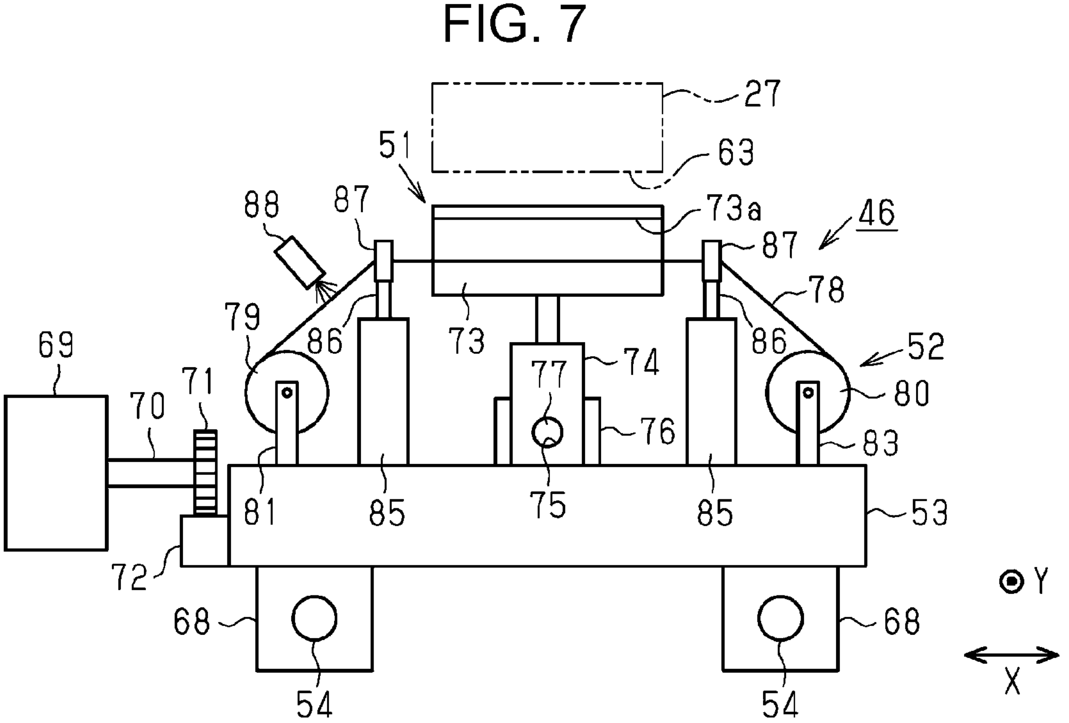
FIG. 7 is a front view of FIG. 6.

As shown in FIG. 6 and FIG. 7, the wiper unit 46 is guided along the pair of rail portions 54 via a guide portion 68 which is fixed on the lower surface of the base member 53 and is able to reciprocally move along the transport direction Y. An electric motor 69 which is a power source is provided on the side of the printer main body 16 (refer to FIG. 1) and a pinion 71 is attached to a tip end portion of an output shaft 70 of the electric motor 69.

In addition, a rack 72 which extends along the transport direction Y is provided on a side portion of the base member 53 of the wiper unit 46 and the rack 72 engages with the pinion 71. Then, when the electric motor 69 is driven with forward rotation, the pinion 71 rotates forward and the wiper unit 46 moves in the transport direction Y along with the rack 72. Meanwhile, when the electric motor 69 is driven with reverse rotation, the pinion 71 is rotated in reverse and the wiper unit 46 moves in the opposite direction from the transport direction Y along with the rack 72.

The first wiping mechanism 51 of the wiper unit 46 is disposed on a central portion on the base member 53 and is provided with a wiping member 73 which has flexibility as one example of the first wiping portion which is able to wipe away ink which is adhered to the nozzle surface 63 and an actuator 74 which supports the wiping member 73 so as to be able raise and lower. A nut portion 75 is provided on a lower portion of the actuator 74 and the nut portion 75 which extends in the transport direction Y and engages with a ball screw 77 which is driven to rotate by a motor 76.

Then, when the motor 76 is driven with forward rotation, the ball screw 77 rotates forward and the wiping member 73 moves in the transport direction Y on the base member 53 along with the actuator 74. Meanwhile, when the motor 76 is driven with reverse rotation, the ball screw 77 rotates in reverse and the wiping member 73 moves in the opposite direction to the transport direction Y on the base member 53 along with the actuator 74. Note that, the wiping member 73 is configured using, for example, a rubber wiper or the like which has a rectangular shape and the actuator 74 is configured using, for example, an air cylinder or the like. In addition, the electric motor 69, the motor 76, and the actuator 74 are controlled to be driven using the control portion 39 (refer to FIG. 1).

The second wiping mechanism 52 of the wiper unit 46 is provided with an absorption member 78 with a lengthwise shape as an example of the second wiping portion which is able absorb and hold the ink which is adhered to the nozzle surface 63 by contacting the nozzle surface 63, a feeding reel 79 which is supported in a state in which the unused absorption member 78 is wound, and a winding reel 80 which winds in and supports the absorption member 78 that is spent due to being fed from the feeding reel 79.

It is possible for an object which is formed with a cord shape, a thread shape, or a cloth shape (belt shape) to be used as the absorption member 78, but an object which is formed with a cord shape is used in the embodiment. As the absorption member 78 with the cord shape, an object where microfibers with a single fiber fineness (thickness of a single fiber) of 10 μm or less are bunched together in a cord shape is preferable, and polyester (sea-island microfibers of approximately 2 μm), nylon (polyamide), or a combination of polyester and nylon (split microfibers of approximately 5 μm) is preferable as the material for the single fibers. In addition, among the materials, single fibers of one type (for example, polyester) may be bunched together in a cord shape or single fibers of a plurality of types (for example, polyester and nylon) may be bunched together in a cord shape.

In a case where the absorption member 78 is formed in a thread shape, it is preferable to use polyester or nylon as the material. In addition, in a case where the absorption member 78 is formed in a cloth shape, it is preferable to use an object which is a knit or a plain weave of microfibers with a single fiber fineness (thickness of a single fiber) of 2 to 10 μm and it is preferable to use polyester (sea-island microfibers of approximately 2 μm) or a combination of polyester and nylon (split microfibers of approximately 5 μm) as the material. As a specific example, TORAYSEE (registered trademark) from Toray Industries Inc. is an exemplification and TORAYSEE PK and TORAYSEE PW are exemplifications of names of TORAYSEE products.

The feeding reel 79 and the winding reel 80 are disposed with a spacing of a predetermined interval in the scanning direction X so as to oppose each other to interpose the ball screw 77. The feeding reel 79 is supported to be able to rotate centered on an axial line which extends in the transport direction Y by a pair of feeding support columns 81 which are erected on the base member 53 and is driven to rotate by a motor 82 which is attached to one out of the pair of feeding support columns 81. In the same manner, the winding reel 80 is supported to be able to rotate centered on an axial line which extends in the transport direction Y by a pair of winding support columns 83 which are erected on the base member 53 and is driven to rotate by a motor 84 which is attached to one out of the pair of winding support columns 83.

A pair of support mechanisms 85 which support the absorption member 78 are erected between the feeding reel 79 and the winding reel 80 on the base member 53 with a spacing of a predetermined interval in the scanning direction X so as to oppose each other to interpose the ball screw 77. In this case, the pair of support mechanisms 85 are disposed with a spacing of an interval which is wider than the width of the nozzle surface 63 in the scanning direction X so as to not impede movement of the wiping member 73 along the transport direction Y.

Figure 8:
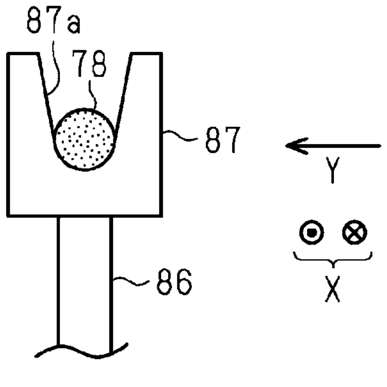
FIG. 8 is an enlarged view of the main portions of a support mechanism.

The support mechanisms 85 have a rod 86 which is configured using an air cylinder which is driven and controlled using, for example, the control portion 39 (refer to FIG. 1) and moves in the up and down direction. A support member 87 which supports the absorption member 78 is provided at the tip end of the rod 86. As shown in FIG. 8, the support member 87 has a receiving portion 87*a* with a concave shape which receives the absorption member 78. Accordingly, it is possible for the height of the absorption member 78 which is positioned between the two receiving portions 87*a* to be modified by moving the two rods 86 in the up and down direction.

Figure 9:
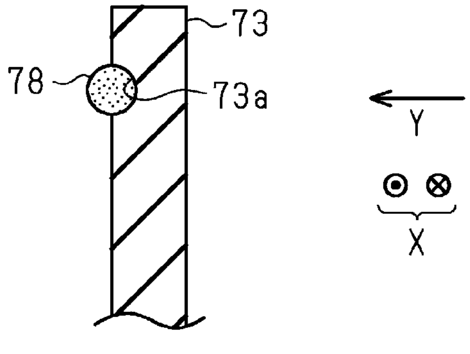
FIG. 9 is an enlarged schematic sectional view illustrating a state when an absorption member is held in a holding groove of a wiping member.

Note that, as shown in FIG. 7 and FIG. 9, a holding groove 73*a* which is able to hold the absorption member 78 by engaging with the absorption member 78 is formed between the two support members 87 at the upper end portion of the wiping member 73 on the surface on the transport direction Y side so as to extend in the scanning direction X. In this case, the holding groove 73*a* is able to hold the absorption member 78 in a state where around half of the absorption member 78 is contained therein.

As shown in FIG. 6 and FIG. 7, the motors 82 and 84 are configured using, for example, servo motors and have torque detecting portions (illustration omitted) which detect the rotational torque at inner portions thereof. The motors 82 and 84 are driven and controlled using the control portion 39 (refer to FIG. 1). Then, the control portion 39 (refer to FIG. 1) imparts a predetermined tension to the absorption member 78 which is fed between the pair of support mechanisms 85 by controlling the driving and rotation direction of the motors 82 and 84 based on the detection signals from the torque detection portions (illustration omitted).

In addition, a cleaning liquid supply portion 88, which coats cleaning liquid onto the unused absorption member 78 that is fed from the feeding reel 79 by spraying, is disposed between the feeding reel 79 and the support mechanism 85 which is closest to the feeding reel 79 out of the pair of support mechanisms 85. Cleaning liquid is coated on the absorption member 78 in order to improve the wiping property of the nozzle surface 63 using the absorption member 78 and is configured by, for example, water or the like. Of course, cleaning liquid may be impregnated in advance into the absorption member 78 in a state of being wound around the feeding reel 79 without the cleaning liquid supply portion 88 being disposed.

Next, an action of the ink jet printer 11 will be described.

In the ink jet printer 11, printing on the recording medium 13 proceeds due to a printing operation in which recording by one scan is executed on the recording medium 13 by ejecting ink droplets from each nozzle 26 of the liquid ejecting head 27 in the middle of movement of the carriage 25 in the scanning direction X and a transport operation in which the recording medium 13 is transported up to a subsequent printing position being alternately repeated. During printing, the wiper unit 46 is in standby at a retreat position which is retreated to the opposite side from the transport direction Y so as not to contact the liquid ejecting head 27 which moves in the transport direction X.

Then, in the ink jet printer 11, at a predetermined timing (during replacement of the ink cartridge 30, during generation of an ejection defect of ink from the nozzle 26, before printing, and the like), ink within the liquid ejecting head 27 from the nozzle 26 is discharged by forcibly suctioning and head cleaning is performed. In a case where head cleaning is performed, first, after the carriage 25 and the liquid ejecting head 27 are moved to the home position HP at which the capping unit 48 is disposed due to driving of the carriage motor 24, the liquid ejecting head 27 is subjected to capping by the cap portion 47 by raising the cap portion 47 by driving the capping motor 49.

Next, when the inside of the cap portion 47 (closed space) is adsorbed by driving the suction pump 50, thickening of ink, air bubbles, and the like within the liquid ejecting head 27 from each nozzle 26 are discharged within the cap portion 47. At this time, since the inside of the cap portion 47 is in a state in which ink that is discharged from each nozzle 26 is filled, ink soaks into a region which corresponds to the inside of the cap portion 47 in the nozzle surface 63.

Then, when ink of a predetermined amount is discharged from each nozzle 26, the suction pump 50 is stopped. Next, the air releasing valve (illustration omitted) which is provided in the cap portion 47 is open, and ink which is residual within the cap portion 47 is discharged by the suction pump 50 being driven for a predetermined time and air suction being performed within the cap portion 47 in a state in which air within the cap portion 47 is released. Next, when the cap portion 47 is lowered by driving of the capping motor 49, the cap portion 47 is separated from the liquid ejecting head 27.

Thereby, head cleaning is complete. After head cleaning is completed, since a region which corresponds to inside the cap portion 47 on the nozzle surface 63 is in a state of being wetted with ink, it is necessary to wipe the nozzle surface 63 that is to remove the ink using the wiper unit 46.

In this case, since the nozzle opening surface 61, that is, the nozzle peripheral region 62 is covered by the liquid repellent film 66, a small ink droplet (smaller ink droplet than the step 65 of 0.1 mm) that is adhered to the nozzle peripheral region 62 flows when the cap portion 47 is separated from the liquid ejecting head 27. For this reason, a state remains in which a large ink droplet (larger ink droplet than the step 65 of 0.1 mm) is adhered to the nozzle peripheral region 62.

Then, in a case where wiping of the nozzle surface 63 is performed by the wiper unit 46, in the ink jet printer 11 of the embodiment, it is possible to perform three types wiping operations of the first maintenance operation, the second maintenance operation, and the third maintenance operation. The first maintenance operation, the second maintenance operation, and the third maintenance operation will be sequentially described below.

First Maintenance Operation

The first maintenance operation is a wiping operation in which the nozzle surface 63 is wiped using the wiping member 73 and wiping of the nozzle surface 63 is performed only using the wiping member 73 without the absorption member 78 being used. Then, in a case where wiping of the nozzle surface 63 is performed using the first maintenance operation, first, the carriage 25 is moved to a position at which the nozzle surface 63 of the liquid ejecting head 27 is wiped using the wiper unit 46 due to the carriage motor 24 being driven.

Figure 10:
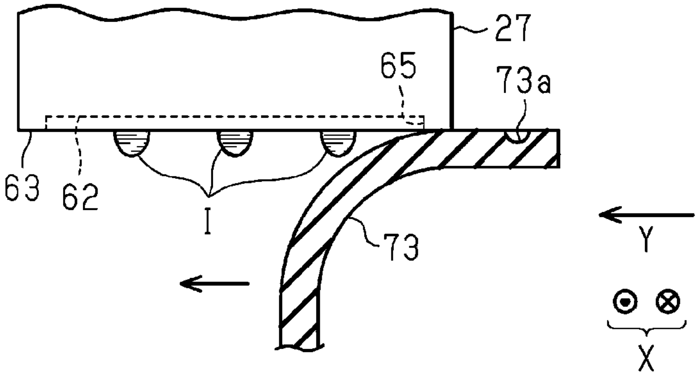
FIG. 10 is a schematic sectional view illustrating a first maintenance operation.

Next, the height of the wiping member 73 is matched with a predetermined height at which it is possible for the wiping member 73 to wipe the nozzle surface 63 due to the actuator 74 being driven. Next, the height of the absorption member 78 which is positioned between the support members 87 is set to be equal to or lower than a height so as to not contact the nozzle surface 63 due to the pair of support mechanisms 85 being driven. Next, as shown in FIG. 10, the wiping member 73 contacts the nozzle surface 63 while its shape elastically changes when the wiper unit 46 is moved from the retreat position in the transport direction Y due to the electric motor 69 being driven.

Next, when the wiper unit 46 is moved in the transport direction Y, the wiping member 73 wipes the entirety of the nozzle surface 63 by sliding on the nozzle surface 63 and ink I which is adhered to the nozzle surface 63 is removed due to being scraped away by the wiping member 73. Due to this, the first maintenance operation is complete. After this, the wiper unit 46 is returned to the retreat position by being moved to the opposite side from the transport direction Y due to the electric motor 69 being driven in a state in which the height of the wiping member 73 is set to be equal to or lower than a height so that the wiping member 73 does not contact the nozzle surface 63 due to the actuator 74 being driven.

Figure 14:
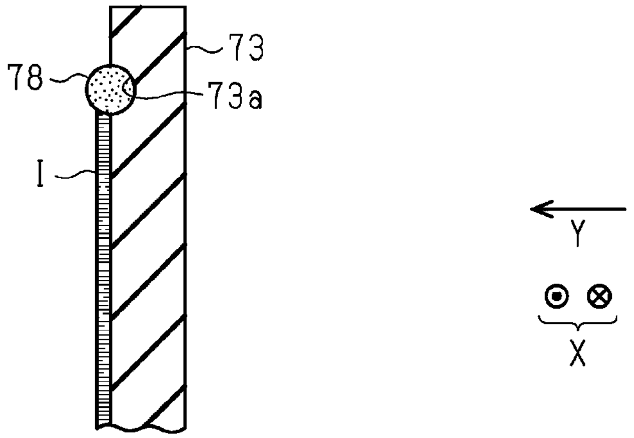
FIG. 14 is a schematic sectional view illustrating a state when cleaning of a wiping member is performed using an absorption member.

In addition, as shown in FIG. 14, the ink I, which the wiping member 73 scrapes away from the nozzle surface 63, is adhered to the surface on the transport direction Y side of the wiping member 73. For this reason, it is necessary to perform cleaning in which the ink I that is adhered to the wiping member 73 is removed. Then, as shown in FIG. 14, in a case of performing cleaning in which the ink I that is adhered to the wiping member 73 is removed, first, by driving the motor 76 and the pair of support mechanisms 85, a state is set where the absorption member 78, which is positioned between the support members 87 of the pair of support mechanisms 85, is caused to contact an upper end portion of the surface on the transport direction Y side of the wiping member 73.

Figure 15:
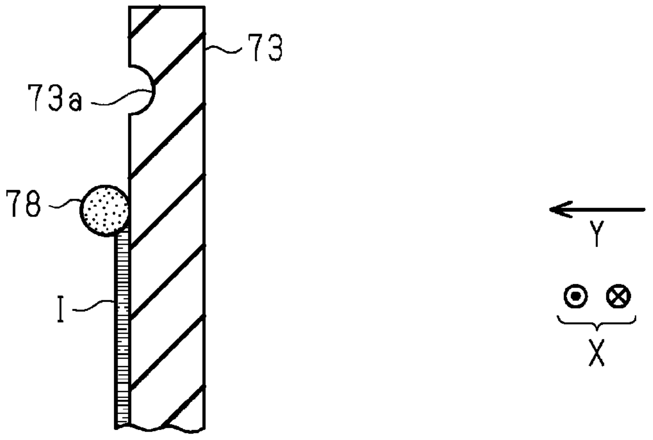
FIG. 15 is a schematic sectional view illustrating a state when cleaning of the wiping member is performed using the absorption member.

In this state, when the absorption member 78 which is caused to contact the upper end portion of the surface on the transport direction Y side of the wiping member 73 due to the pair of support mechanisms 85 being driven is caused to slide downward while the wiping member 73 is stationary, as shown in FIG. 15, the ink I which is adhered to the surface on the transport direction Y side of the wiping member 73 is absorbed and removed by the absorption member 78. At this time, the tension which is applied to the absorption member 78 is maintained since the extent to which the absorption member 78 is slackened due to the absorption member 78 being lowered is wound by the winding reel 80 due to the motor 84 being driven.

After this, cleaning of the wiping member 73 is complete due to the absorption member 78 sliding up to the lower end of the surface on the transport direction Y side on the wiping member 73. Note that, even if the ink I which is adhered to the wiping member 73 is not absorbed by the absorption member 78, the ink I is scraped off from the wiping member 73 using the absorption member 78. Note that, the part of the absorption member 78 which is fouled by the ink I is moved more to the downstream side (the side of the winding reel 80) than the support mechanism 85 which is closest to the winding reel 80 out of the pair of support mechanisms 85 due to the absorption member 78 being wound by the winding reel 80.

Second Maintenance Operation

The second maintenance operation is a wiping operation in which the nozzle surface 63 is wiped by the absorption member 78 being caused to contact the nozzle surface 63 due to the absorption member 78 being biased by the wiping member 73 and wiping of the nozzle surface 63 is performed by using both the absorption member 78 and the wiping member 73. Then, in a case where wiping of the nozzle surface 63 is performed using the second maintenance operation, first, the carriage 25 is moved to a position at which the nozzle surface 63 of the liquid ejecting head 27 is wiped using the wiper unit 46 due to the carriage motor 24 being driven.

Next, the height of the wiping member 73 is matched with a predetermined height at which it is possible for the wiping member 73 to wipe the nozzle surface 63 due to the actuator 74 being driven. Next, the height of the absorption member 78 which is positioned between the support members 87 is set to a height which is the same as the holding groove 73*a* of the wiping member 73 due to the pair of support mechanisms 85 being driven. Next, there is a state where the absorption member 78 is held in the holding groove 73*a* due to the wiping member 73 being moved by the motor 76 being driven.

Figure 11:
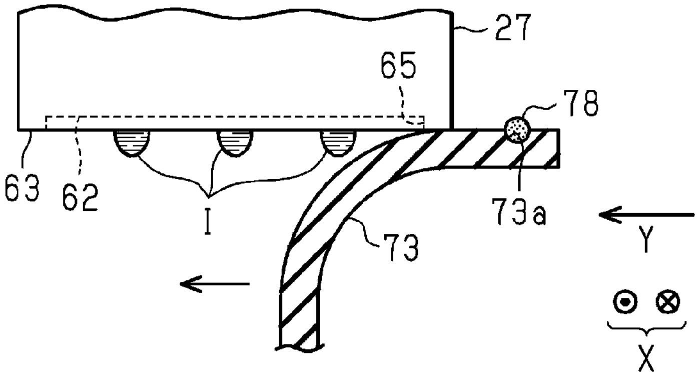
FIG. 11 is a schematic sectional view illustrating a second maintenance operation.

In this state, when the wiper unit 46 is moved from the retreat position in the transport direction Y due to the electric motor 69 being driven, as shown in FIG. 11, the wiping member 73 contacts the nozzle surface 63 while elastically changing shape before the absorption member 78.

Figure 12:
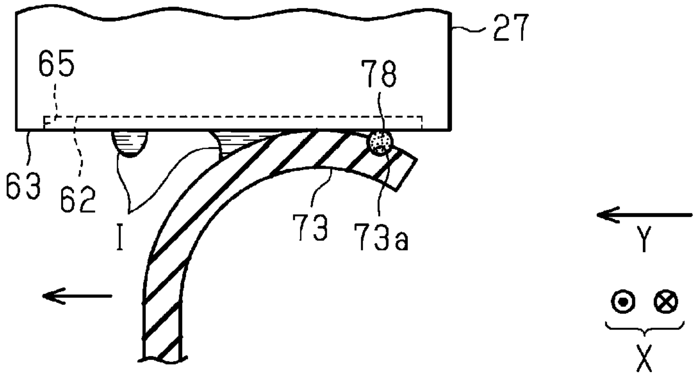
FIG. 12 is a schematic sectional view illustrating the second maintenance operation.

Next, when the wiper unit 46 is moved in the transport direction Y, the wiping member 73 wipes the nozzle surface 63 by sliding on the nozzle surface 63, and as shown in FIG. 12, there is a state where both the wiping member 73 and the absorption member 78 contact the nozzle surface 63. In this state, the elastic recovery force of the wiping member 73 acts as a pressuring force which presses the absorption member 78 against the nozzle surface 63. That is, the absorption member 78 is pressed against the nozzle surface 63 due to the wiping member 73 biasing the absorption member 78.

Figure 13:
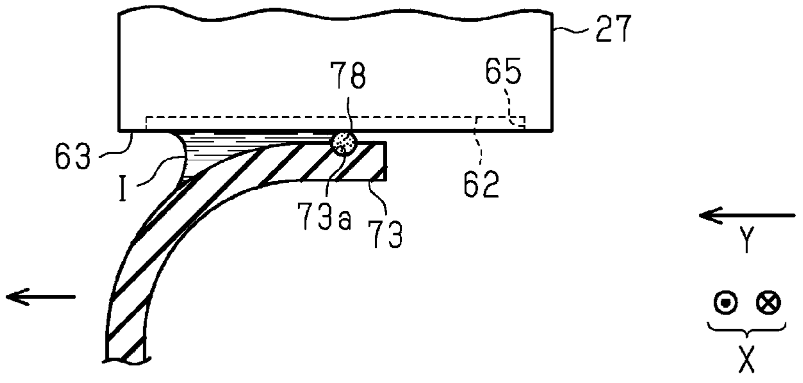
FIG. 13 is a schematic sectional view illustrating the second maintenance operation.

Next, when the wiper unit 46 is moved in the transport direction Y, the ink I which is adhered to the nozzle surface 63 is wiped away due to both the wiping member 73 and the absorption member 78 sliding the nozzle surface 63 in a state in which the wiping member 73 presses the absorption member 78 on the nozzle surface 63. Next, when the wiper unit 46 is moved in the transport direction Y, as shown in FIG. 13, there is a state in which the wiping member 73 presses the absorption member 78 on the nozzle surface 63 while the wiping member 73 separates from the nozzle surface 63.

Next, when the wiper unit 46 is moved in the transport direction Y, the absorption member 78 wipes the entirety of the nozzle surface 63 due to sliding on the nozzle surface 63 and the ink I which is adhered to the nozzle surface 63 absorbed and removed by the absorption member 78. Due to this, the second maintenance operation is complete.

In this manner, the nozzle surface 63 is wiped in the second maintenance operation in a state in which the absorption member 78 is pressed on the nozzle surface 63 due to the wiping member 73 biasing the absorption member 78. That is, the nozzle surface 63 is stably wiped using the absorption member 78 in the second maintenance operation since the state of contact of the absorption member 78 with respect to the nozzle surface 63 is stable.

After this, the height of the wiping member 73 is set to be equal to or lower than a height so that the wiping member 73 does not contact the nozzle surface 63 due to the actuator 74 being driven and the absorption member 78 which is positioned between the pair of support mechanisms 85 is lowered to the same extent as the wiping member 73 by the pair of support mechanisms 85 being driven.

At this time, the tension which is applied to the absorption member 78 is maintained since the extent to which the absorption member 78 is slackened due to the absorption member 78 being lowered is wound by the winding reel 80 due to the motor 84 being driven. Accordingly, the state in which the absorption member 78 is held in the holding groove 73*a* of the wiping member 73 is maintained. Next, the wiper unit 46 is returned to the retreat position by being moved to the opposite side from the transport direction Y due to the electric motor 69 being driven.

In addition, as shown in FIG. 14, the ink I is adhered to a region on the surface on the transport direction Y side of the wiping member 73 more to the lower side than the holding groove 73*a* due to the second maintenance operation described above being performed. For this reason, it is necessary to perform cleaning in which the ink I that is adhered to the wiping member 73 is removed.

Then, in a case of performing cleaning in which the ink I that is adhered to the wiping member 73 is removed, in the state which is shown in FIG. 14, when the absorption member 78 which is held in the holding groove 73*a* of the wiping member 73 is caused to slide downward due to the pair of support mechanisms 85 being driven while the wiping member 73 is stationary, as shown in FIG. 15, the ink I which is adhered to the surface on the transport direction Y side of the wiping member 73 is absorb and removed by the absorption member 78. At this time, the tension which is applied to the absorption member 78 is maintained since the extent to which the absorption member 78 is slackened due to the absorption member 78 being lowered is wound by the winding reel 80 due to the motor 84 being driven.

After this, cleaning of the wiping member 73 is complete due to the absorption member 78 sliding up to the lower end of the surface on the transport direction Y side on the wiping member 73. Note that, even if the ink I which is adhered to the wiping member 73 is not absorbed by the absorption member 78, the ink I is scraped off from the wiping member 73 using the absorption member 78. Note that, the part of the absorption member 78 which is fouled by the ink I is moved more to the downstream side (the side of the winding reel 80) than the support mechanism 85 which is closest to the winding reel 80 out of the pair of support mechanisms 85 due to the absorption member 78 being wound by the winding reel 80.

Third Maintenance Operation

The third maintenance operation is a wiping operation where the nozzle surface 63 is wiped using the absorption member 78 and wiping of the nozzle surface 63 is performed using only the absorption member 78 without the absorption member 78 being biased by the wiping member 73. Then, in a case where wiping of the nozzle surface 63 is performed using the third maintenance operation, first, the carriage 25 is moved to a position at which the nozzle surface 63 of the liquid ejecting head 27 is wiped using the wiper unit 46 due to the carriage motor 24 being driven.

Figure 16:
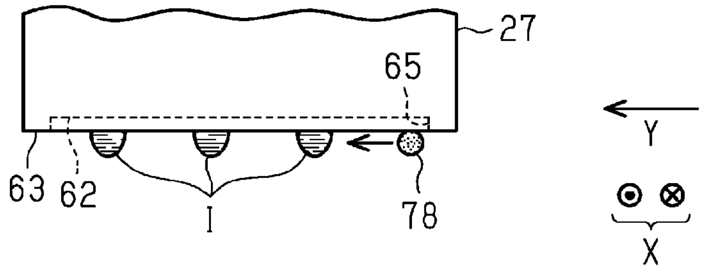
FIG. 16 is a schematic sectional view illustrating a third maintenance operation.

Next, the height of the absorption member 78 which is positioned between the support members 87 is matched with a predetermined height at which it is possible for the absorption member 78 to wipe the nozzle surface 63 due to the pair of support mechanisms 85 being driven. Next, the height of the wiping member 73 is set to be equal to or lower than a height so that the wiping member 73 does not contact the nozzle surface 63 due to the actuator 74 being driven. Next, as shown in FIG. 16, the absorption member 78 contacts the nozzle surface 63 when the wiper unit 46 is moved from the retreat position in the transport direction Y due to the electric motor 69 being driven.

Next, when the wiper unit 46 is moved in the transport direction Y, the absorption member 78 wipes the entirety of the nozzle surface 63 due to sliding on the nozzle surface 63 and the ink I which is adhered to the nozzle surface 63 absorbed and removed by the absorption member 78. Due to this, the third maintenance operation is complete. After this, the wiper unit 46 is returned to the retreat position by being moved to the opposite side from the transport direction Y due to the electric motor 69 being driven in a state where the height of the absorption member 78 which is positioned between the support members 87 is set to be equal to or lower than a height so that the absorption member 78 does not contact the nozzle surface 63 due to the pair of support mechanisms 85 being driven.

At this time, the tension which is applied to the absorption member 78 is maintained since the extent to which the absorption member 78 is slackened due to the absorption member 78 being lowered is wound by the winding reel 80 due to the motor 84 being driven. Note that, the part of the absorption member 78 which is fouled by the ink I is moved more to the downstream side (the side of the winding reel 80) than the support mechanism 85 which is closest to the winding reel 80 out of the pair of support mechanisms 85 due to the absorption member 78 being wound by the winding reel 80.

The first maintenance operation, the second maintenance operation, and the third maintenance operation are described above, but it is preferable that the selection of which out of these is decided upon depending on the amount and viscosity of the ink I which is adhered to the nozzle surface 63. For example, in a case where there is a large amount of the ink I which is adhered to the nozzle surface 63 or the viscosity of the ink I is high, the second maintenance operation is selected since it is necessary for the nozzle surface 63 to be firmly wiped.

In addition, for example, in a case where there is a small amount of the ink I which is adhered to the nozzle surface 63 or the viscosity of the ink I is low, the first maintenance operation or the third maintenance operation is selected since it is possible to remove the ink I which is adhered to the nozzle surface 63 even without the nozzle surface 63 being wiped to the level of the second maintenance operation.

In addition, when wiping of the nozzle surface 63 is performed using, in particular, the second maintenance operation, there are cases where the absorption member 78 does not contact the entirety of the nozzle peripheral region 62, but the absorption member 78 reliably contacts the ink I which is adhered to the nozzle peripheral region 62 even in these cases since the size of the ink I which is adhered to the nozzle peripheral region 62 is equal to or more than the step 65 (0.1 mm). For this reason, the ink I which is adhered to the nozzle peripheral region 62 is reliably absorbed and removed by the absorption member 78.

Note that, wiping of the nozzle surface 63 using any of the first maintenance operation, the second maintenance operation, or the third maintenance operation is performed at a predetermined timing which is not only after head cleaning but also during printing since ink mist which is generated during printing is adhered to the nozzle surface 63.

According to the embodiment described above, it is possible to obtain the effects indicated below.

(1) It is possible for the ink jet printer 11 to perform the first maintenance operation in which the nozzle surface 63 is wiped using the wiping member 73 and the second maintenance operation in which the absorption member 78 is caused to contact the nozzle surface 63 due to the absorption member 78 being biased by the wiping member 73. For this reason, it is possible for the absorption member 78 to be caused to stably contact the nozzle surface 63 due to the second maintenance operation, in particular, being selectively performed. Accordingly, it is possible to stably wipe the nozzle surface 63 on which the nozzle 26 that ejects ink is disposed.

(2) It is possible for the ink jet printer 11 to perform the third maintenance operation in which the absorption member 78 is caused to contact the nozzle surface 63 without the absorption member 78 being biased by the wiping member 73. For this reason, it is possible to perform wiping of the nozzle surface 63 in which damage to the nozzle surface 63 is suppressed by performing the third maintenance operation.

(3) The ink jet printer 11 performs cleaning of the wiping member 73 due to the absorption member 78 being caused to contact the wiping member 73. For this reason, it is possible for the absorption member 78 to also be used as a cleaner for the wiping member 73.

(4) In the ink jet printer 11, the first wiping portion is configured by the wiping member 73 which has flexibility and the second wiping portion is configured by the absorption member 78 with a lengthwise shape which is able to absorb the ink I. For this reason, it is possible for the ink I which is adhered to the nozzle surface 63 to be scraped away using the wiping member 73 or to be absorbed using the absorption member 78.

Modification Examples

Note that, the embodiments may be modified as below.

Figure 17:
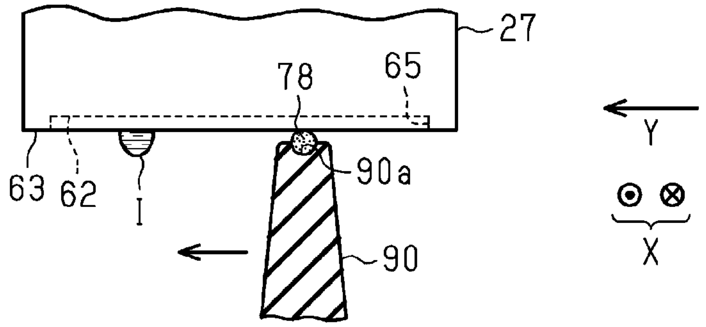
FIG. 17 is a schematic sectional view illustrating the second maintenance operation in a modification example.
Figure 18:
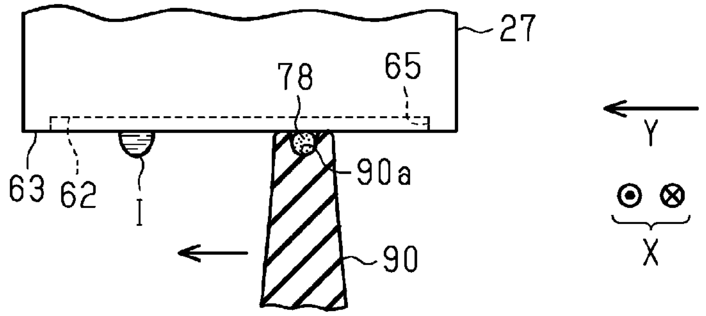
FIG. 18 is a schematic sectional view illustrating the second maintenance operation in a modification example.
Figure 19:
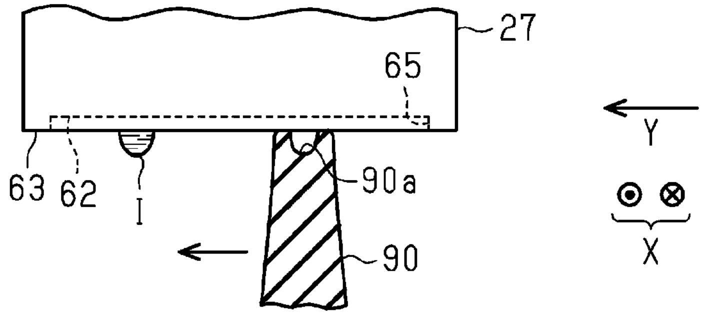
FIG. 19 is a schematic sectional view illustrating the first maintenance operation in a modification example.

As shown in FIG. 17, a wiping member 90 with flexibility which is formed in substantially a block shape, which has a holding groove 90*a* which extends in the scanning direction X so as to be able to hold the absorption member 78 at an upper end, may be used as the first wiping portion in place of the wiping member 73. In this case, in a case where wiping of the nozzle surface 63 is performed using the second maintenance operation, only the absorption member 78 may contact the nozzle surface 63 as shown in FIG. 17 or both the wiping member 90 and the absorption member 78 may contact the nozzle surface 63 as shown in FIG. 18 due to the wiping member 90 biasing the absorption member 78. Furthermore, in this case, in a case where wiping of the nozzle surface 63 is performed using the first maintenance operation, as shown in FIG. 19, two locations on the tip end portion of the wiping member 90 which interpose the holding groove 90*a* contact the nozzle surface 63.

Figure 20:
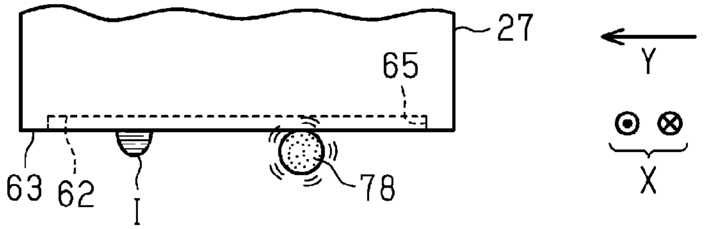
FIG. 20 is a schematic sectional view illustrating the third maintenance operation in a modification example.
Figure 21:
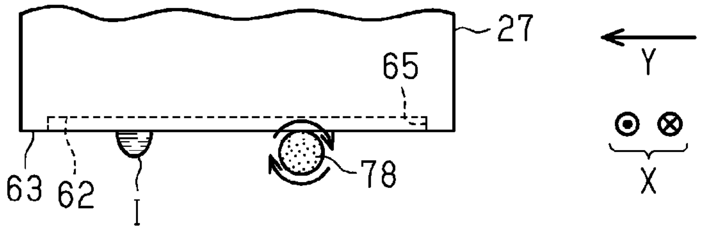
FIG. 21 is a schematic sectional view illustrating the third maintenance operation in a modification example.

In the maintenance operation in which the absorption member 78 is used, that is, in the third maintenance operation, as shown in FIG. 20, the absorption member 78 may vibrate, and as shown in FIG. 21, the absorption member 78 may be rotated. By doing this, it is possible to improve the wiping property of the nozzle surface 63 using the absorption member 78. Note that, the absorption member 78 may be vibrated or the absorption member 78 may be rotated even in the second maintenance operation since the absorption member 78 is used.

Figure 22:
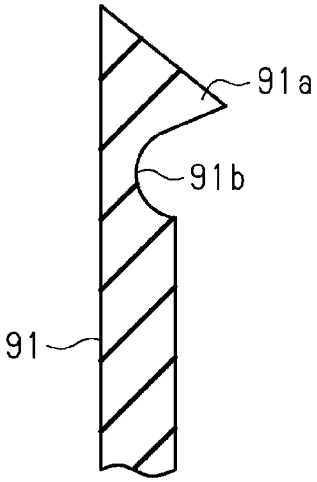
FIG. 22 is an enlarged sectional schematic view of a wiping member in a modification example.
Figure 23:
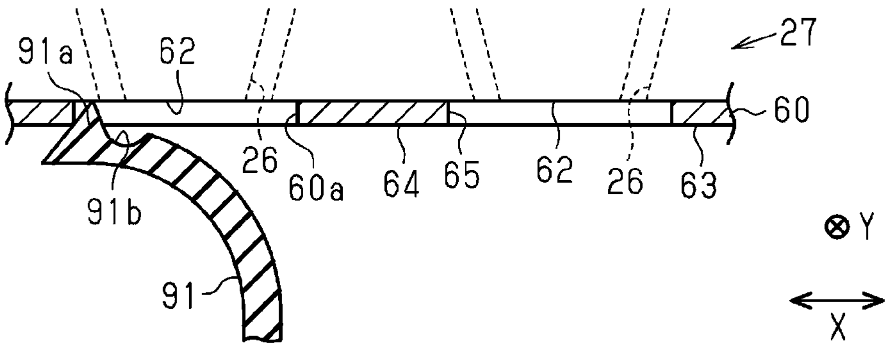
FIG. 23 is a schematic sectional view illustrating the first maintenance operation in a modification example.
Figure 24:
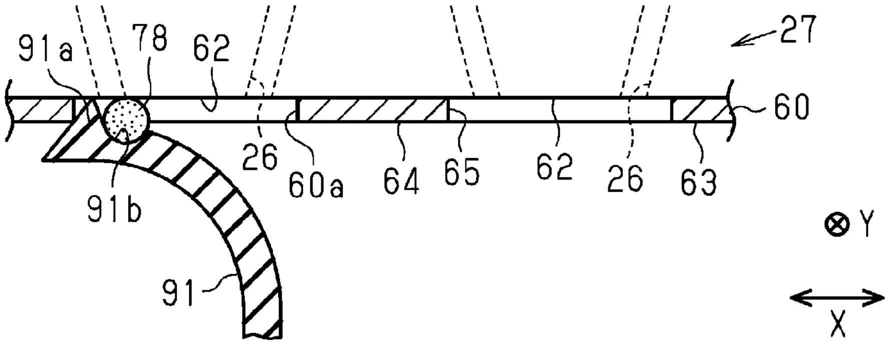
FIG. 24 is a schematic sectional view illustrating the second maintenance operation in a modification example.
Figure 25:
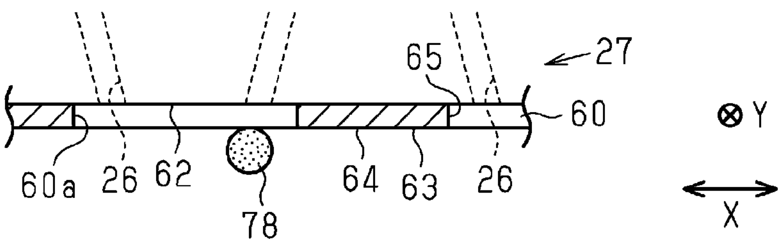
FIG. 25 is a schematic sectional view illustrating the third maintenance operation in a modification example.

As shown in FIG. 22, the wiping member 73 may be modified to a wiping member 91 with flexibility which is formed in a crooked neck shape in perspective view. That is, the wiping member 91 has an apex portion 91*a* which is erected with a triangular shape in sectional view at the tip end portion of the surface on the side at which the nozzle surface 63 is wiped and a holding groove 91*b* which is able to hold the absorption member 78 by being formed so as to be adjacent to the apex portion 91*a*, and the wiping member 91 is formed to have an overall shape which is substantially a rectangular shape. In this case, the wiper unit 46 is disposed such that the absorption member 78 extends in the transport direction Y and is positioned on the side which is closer to the support base 12 than the wiping member 91. Furthermore, in this case, in a case where the first to third maintenance operations are performed, the nozzle surface 63 side is moved in the scanning direction X in a state in which the wiper unit 46 is stationary. Then, in a case where the first maintenance operation is performed, as shown in FIG. 23, it is possible for not only the ink which is adhered to the protrusion surface 64 but also the ink which is adhered to the nozzle peripheral region 62 to be reliably wiped since the apex portion 91*a* of the wiping member 91 enters up to the nozzle peripheral region 62. In addition, in a case where the second maintenance operation is performed, as shown in FIG. 24, it is possible for not only the ink which is adhered to the protrusion surface 64 but also the ink which is adhered to the nozzle peripheral region 62 to be reliably absorbed and removed since the apex portion 91*a* of the wiping member 91 and the absorption member 78 enter up to the nozzle peripheral region 62. Furthermore, in a case where the third maintenance operation is performed, as shown in FIG. 25, it is possible for the ink which is adhered to the nozzle surface 63 to be appropriately absorbed and removed using the absorption member 78 in the same manner as the embodiment described above.

Figure 26:
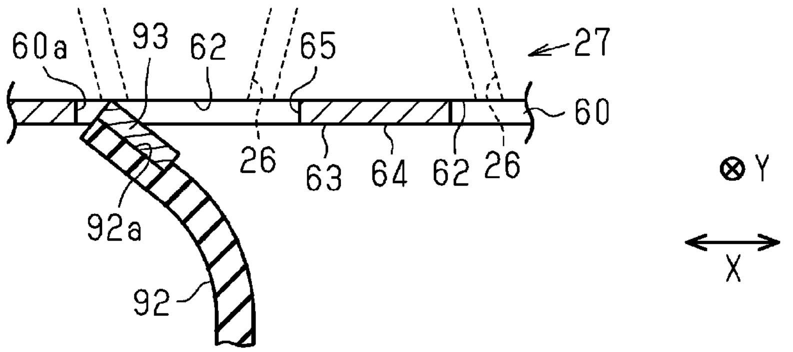
FIG. 26 is a schematic sectional view illustrating the second maintenance operation in a modification example.

As shown in FIG. 26, a wiping member 92 with a rectangular shape which has flexibility may be used as the first wiping portion in place of the wiping member 73 and an absorption member 93 with a rectangular shape which is a lengthwise shape may be used as the second wiping portion in place of the absorption member 78. The absorption member 93 is formed with a cloth shape and absorbs ink. A holding portion 92*a* which holds the absorption member 93 is recessed into a tip end portion of the wiping member 92 on a surface on the side which wipes the nozzle surface 63. Then, in a case where the second maintenance operation is performed, as shown in FIG. 26, it is possible for not only the ink which is adhered to the protrusion surface 64 but also the ink which is adhered to the nozzle peripheral region 62 to be reliably absorbed and removed since a pointed corner of the absorption member 93 contacts the nozzle peripheral region 62 due to the absorption member 93 entering up to the nozzle peripheral region 62. In this case, the wiper unit 46 is disposed such that the absorption member 93 extends in the transport direction Y and is positioned on the side which is closer to the support base 12 than the wiping member 92, and the nozzle surface 63 side is moved in the scanning direction X in a state in which the wiper unit 46 is stationary.

Figure 27:
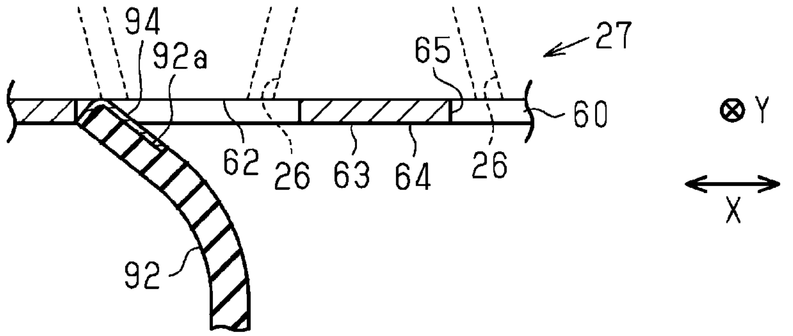
FIG. 27 is a schematic sectional view illustrating the second maintenance operation in a modification example.

As shown in FIG. 27, the wiping member 92 in FIG. 26 described above may be used as the first wiping portion in place of the wiping member 73 and an absorption member 94 with a lengthwise shape which forms an L cubic shape in sectional view may be used as the second wiping portion in place of the absorption member 78. The absorption member 94 is formed with a cloth shape and absorbs ink. Then, in a case where the second maintenance operation is performed, as shown in FIG. 27, it is possible for not only the ink which is adhered to the protrusion surface 64 but also the ink which is adhered to the nozzle peripheral region 62 to be reliably absorbed and removed since a corner portion of the absorption member 94 contacts the nozzle peripheral region 62 due to the absorption member 94 entering up to the nozzle peripheral region 62. In this case, the wiper unit 46 is disposed such that the absorption member 94 extends in the transport direction Y and is positioned on the side which is closer to the support base 12 than the wiping member 92, and the nozzle surface 63 side is moved in the scanning direction X in a state in which the wiper unit 46 is stationary.

Figure 28:
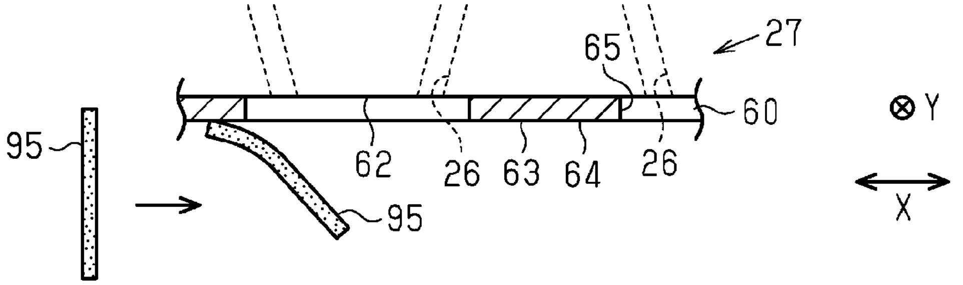
FIG. 28 is a schematic sectional view illustrating the third maintenance operation in a modification example.

As shown in FIG. 28, an absorption member 95 with a lengthwise belt shape may be used as the second wiping portion in place of the absorption member 78. The absorption member 95 is formed with a cloth shape and absorbs ink. Then, in a case where the third maintenance operation is performed, as shown in FIG. 28, the absorption member 95 may be caused to contact the nozzle surface 63 in a state of being inclined so as to have a predetermined amount for projecting toward nozzle surface 63. In this case, the wiper unit 46 is disposed such that the absorption member 93 extends in the transport direction Y and is positioned on the side which is closer to the support base 12 than the wiping member 73, and the nozzle surface 63 side is moved in the scanning direction X in a state in which the wiper unit 46 is stationary. By doing this, in the same manner as the embodiment described above, it is possible for the ink which is adhered to the nozzle surface 63 to be appropriately absorbed and removed using the absorption member 95.

Figure 29:
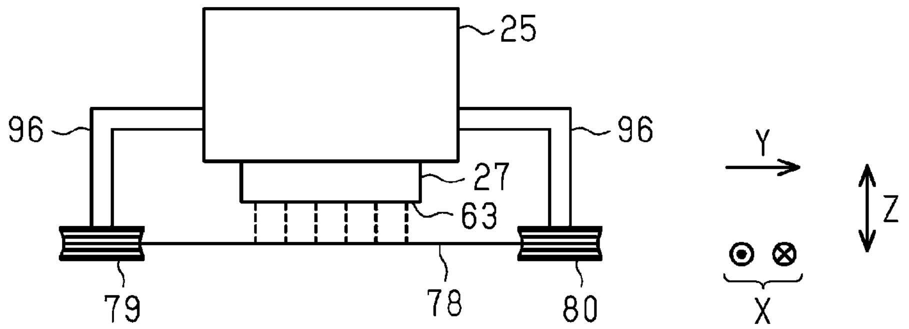
FIG. 29 is a schematic view illustrating a state when flushing of an absorption member is performed in a modification example.
Figure 30:
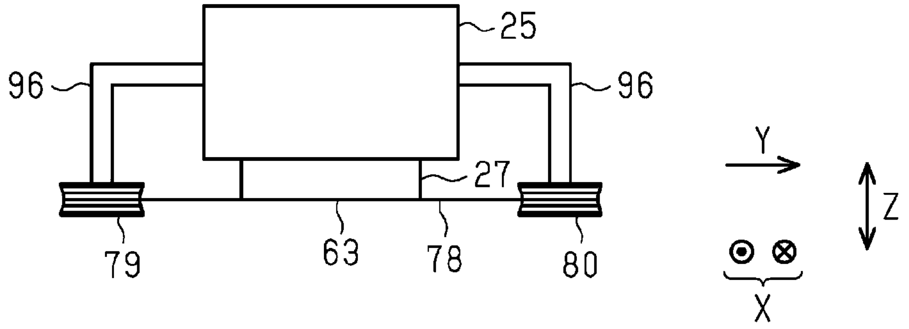
FIG. 30 is a schematic side-surface view illustrating the third maintenance operation in a modification example.
Figure 31:
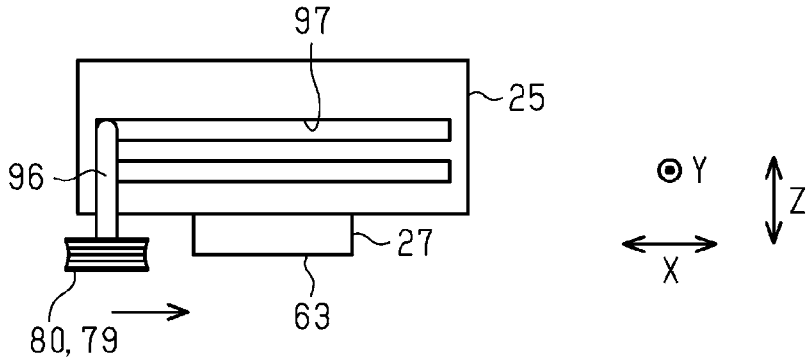
FIG. 31 is a schematic front view of FIG. 30.
Figure 32:
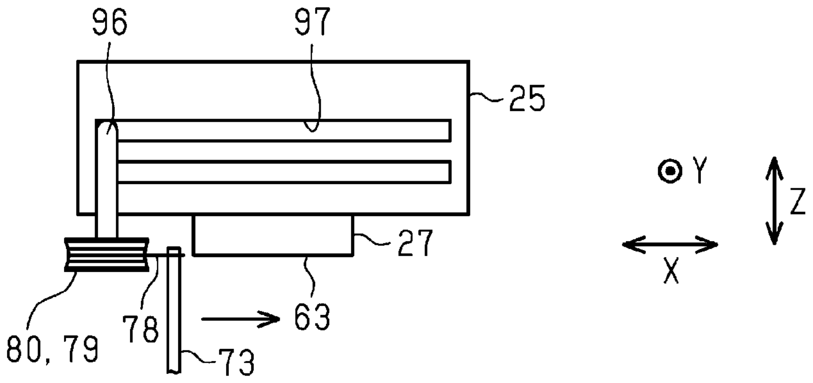
FIG. 32 is a schematic view illustrating a state when the second maintenance operation is performed in a modification example.
Figure 33:
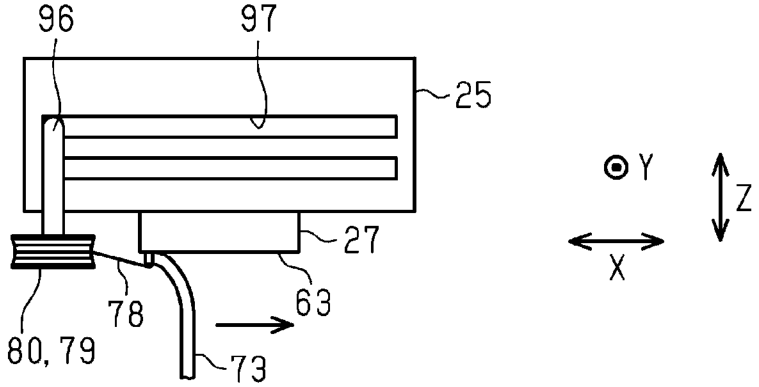
FIG. 33 is a schematic view illustrating a state when the second maintenance operation is performed in a modification example.
Figure 34:
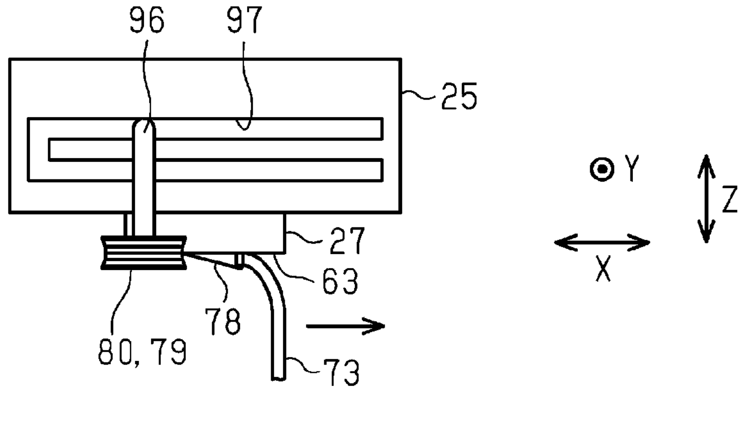
FIG. 34 is a schematic view illustrating a state when the second maintenance operation is performed in a modification example.

As shown in FIG. 29 and FIG. 31, the feeding reel 79 and the winding reel 80 may be supported in the carriage 25 via a pair of arms 96 which form an L shape so as to be able to rotate. The feeding reel 79 and the winding reel 80 are disposed so as to oppose each other to interpose the carriage 25 and so are able to be rotated and driven using a motor (illustration omitted) centered on an axial line which extends in the vertical direction Z. In addition, the pair of arms 96 are guided by guide grooves 97 which are provided on the side surface of the carriage 25 and are able to reciprocally move along with the feeding reel 79 and the winding reel 80 in the vertical direction Z and the scanning direction X due to the motor (illustration omitted) being driven. By doing this, as shown in FIG. 29, it is possible to perform flushing in which ink is discharged unrelated to printing into the absorption member 78, which is between the feeding reel 79 and the winding reel 80, from the nozzles 26 of the liquid ejecting head 27 with the object of elimination and the like of clogging of the nozzles 26. Furthermore, as shown in FIG. 30 and FIG. 31, it is possible to perform wiping of the nozzle surface 63 using the third maintenance operation due to the feeding reel 79 and the winding reel 80 being moved in the scanning direction X in a state in which the height of the absorption member 78, which is between the feeding reel 79 and the winding reel 80, is matched with a height at which it is possible for the absorption member 78 to contact the nozzle surface 63. In addition, in a case where wiping of the nozzle surface 63 is performed using the second maintenance operation, as shown in FIG. 32 and FIG. 33, the absorption member 78 may be pulled out from the feeding reel 79 due to the wiping member 73 being moved along the scanning direction X in a state in which the absorption member 78, which is between the feeding reel 79 and the winding reel 80, is held in the holding groove 73*a* of the wiping member 73. In this case, as shown in FIG. 34, the absorption member 78 may not be pulled out from the feeding reel 79 due to the feeding reel 79 and the winding reel 80 being moved together with the wiping member 73.

Wiping of the nozzle surface 63 may be performed with the second maintenance operation performed after the first maintenance operation is performed. By doing this, it is possible to effectively remove the ink, which remains on the nozzle surface 63 in the first maintenance operation, in the second maintenance operation. In this case, it is possible to reduce damage which is imparted on the nozzle peripheral region 62 due to the first maintenance operation since the first maintenance operation is performed in a state in which the nozzle peripheral region 62 is wetted by ink and it is possible for the ink which remains on the nozzle peripheral region 62 (including foreign matter) to be absorbed and removed in the second maintenance operation after the first maintenance operation.

The absorption member 78 may have multiple fine hairs on the surface. In this case, it is preferable that the hairs are of a fineness so as to be able to enter inside of the nozzles 26.

A cloth wiper (cloth with a belt shape which is able to absorb ink) may be used as the second wiping portion and a roller with flexibility which is able to press the cloth wiper may be used as the first wiping portion.

It is not necessary for the first wiping portion to have flexibility. That is, the first wiping portion may be configured using, for example, metal or the like with favorable sliding properties.

It is not necessary for the second wiping portion to be able to absorb ink. That is, it is sufficient if the second wiping portion is able to hold ink and the second wiping portion may be configured using, for example, a rope which is combined using a plurality of wires. In this case, the ink which is scrapped from the nozzle surface 63 is held in the concavities and convexities in the surface of the rope due to the surface tension.

It is not necessary for the wiping member 73 to be cleaned using the absorption member 78.

The ink jet printer 11 need not be able to perform the third maintenance operation.

The cleaning of the wiping member 73 using the absorption member 78 may be carried out with the wiping member 73 being moved upwards while the absorption member 78 is kept stationary in a state where the absorption member 78 and the wiping member 73 are caused to contact or may be carried out with the wiping member 73 being moved upwards while the absorption member 78 is moved downwards.

The protrusion surface 64 may be formed so as to be integrally formed with the liquid ejecting head 27 without using the cover member 60. In this case, the nozzle opening surface 61 is configured by the uneven surface.

The liquid ejecting head 27 may perform head cleaning by capping each nozzle row 59. By doing this, since it is possible to set the cap portion to be small in comparison to a case in which head cleaning is performed by capping all nozzle rows 59 with the cap portion 47, it is possible to reduce the amount of ink consumed during head cleaning.

Flushing may be performed by discharging ink with the object of elimination and the like of clogging of the nozzle 26 unrelated to printing from the nozzle 26 of the liquid ejecting head 27 in a region in which the absorption member 78 is spent in the wiper unit 46 (region in which the nozzle surface 63 is wiped).

Wiping of the nozzle surface 63 by the wiper unit 46 may be performed by moving the nozzle surface 63 in a state in which the wiper unit 46 is stationary, and may be performed by moving both the wiper unit 46 and the nozzle surface 63.

In a case where there are a plurality of the liquid ejecting heads 27, for example, two as in the embodiment, wiping of the nozzle surface 63 of one of the liquid ejecting heads 27 using the wiper unit 46 and flushing from the nozzle 26 of the other of the liquid ejecting head 27 into the liquid receiving portion 44 of the flushing unit 45 may be performed in parallel.

The ink jet printer 11 may not be provided with the carriage 25 which supports the liquid ejecting head 27, and may be a line head type which is provided with a line head with the printing range across the entire width of the recording medium 13. In this case, since the line head is fixed and does not move, the nozzle surface is wiped by moving the wiper unit.

In the embodiment, the liquid ejecting apparatus may be a liquid ejecting apparatus that ejects and discharges another liquid other than ink. Note that, the state of the liquid which is discharged in a liquid droplet in a very small amount from the liquid ejecting apparatus is set to include pulling out in a tail a granular shape, a tear shape, and a yarn shape. In addition, the liquid here may be a material such that it is possible to eject from the liquid ejecting apparatus. For example, it is sufficient if the material is in a state when a substance is in a liquid phase, and the material includes a fluid state body such as a liquid state body having high or low viscosity, a sol, a gel, and other materials such as an inorganic solvent, an organic solvent, a solution, a liquid state resin, and a liquid metal (molten metal). In addition, the state of the substance is not limited only to liquid, and a substance where particles of a functional material made from a solid substance such as a pigment or metallic particles are dissolved, dispersed, mixed, or the like in a solvent are included. As a representative example of liquid examples are given such as ink and liquid crystal which are described in the embodiment described above. Here, ink contains various types of liquid-form compositions such as a typical water-based ink, oil-based ink, gel ink, and hot melt ink. As a specific example of the liquid ejecting apparatus, for example, there is a liquid ejecting apparatus which ejects liquid that includes a material such as an electrode material or a color material which is used in manufacture and the like of a liquid crystal display, an electro-luminescence (EL) display, a surface light emission display, and a color filter in a dispersed or dissolved form. In addition, the apparatus may be a liquid ejecting apparatus which ejects a bio-organic material that is used in biochip manufacture, a liquid ejecting apparatus which ejects liquid that is a sample that is used as a precision pipette, a textile printing apparatus, a micro dispenser, and the like. Furthermore, the apparatus may be a liquid ejecting apparatus which ejects lubricant oil with pinpoint precision in precision machinery such as a watch or a camera, a liquid ejecting apparatus which ejects a transparent resin liquid such as an ultraviolet curable resin on a substrate in order to form a micro-spherical lens (an optical lens) which is used in an optical communication element or the like, and the like. In addition, the apparatus may be a liquid ejecting apparatus which ejects acidic or alkaline etching liquid in order to carry out etching on a substrate or the like.

This application is a continuation of U.S. application Ser. No. 17/331,224 filed May 26, 2021 which is a continuation of Ser. No. 16/795,368, filed Feb. 19, 2020, and granted on Jul. 6, 2021, as U.S. Pat. No. 11,052,661, which is a continuation of U.S. application Ser. No. 16/419,269, filed May 22, 2019, and granted on Sep. 8, 2020, as U.S. Pat. No. 10,766,262, which is a continuation of U.S. application Ser. No. 15/860,448, filed Jan. 2, 2018, and granted on Jul. 23, 2019, as U.S. Pat. No. 10,357,973, which is a continuation of U.S. application Ser. No. 15/285,293, filed Oct. 4, 2016, and granted on Feb. 13, 2018, as U.S. Pat. No. 9,889,669, which claims priority to Japanese Patent Application No. 2015-197401, filed Oct. 5, 2015, all foregoing applications are expressly incorporated by reference herein.

What is claimed is:

1. A liquid ejecting apparatus comprising:

a liquid ejecting head configured to eject liquid from a nozzle disposed on a nozzle surface;

a first wiping portion that has flexibility and configured to wipe the nozzle surface;

a second wiping portion provided separately from the first wiping portion and configured to absorb the liquid adhering to the nozzle surface; and a control portion configured to control the first wiping portion and the second wiping portion, wherein the control portion is configured to perform a first maintenance operation that wipes the nozzle surface by the first wiping portion, a cleaning operation for cleaning the first wiping portion by contacting the first wiping portion and the second wiping portion, and a second maintenance operation that wipes the nozzle surface by the second wiping portion.

2. The liquid ejecting apparatus according to claim 1, wherein the first wiping portion and the second wiping portion are configured to wipe the nozzle surface in a wiping direction.

3. The liquid ejecting apparatus according to claim 2, further comprising:

a base member supporting the first wiping portion and the second wiping portion, wherein the base member is configured to be reciprocally moved along the wiping direction.

4. The liquid ejecting apparatus according to claim 1, further comprising:

a cleaning liquid supply portion configured to supply a cleaning liquid to the second wiping portion before the second wiping portion wipes the nozzle surface.

5. A control method for a liquid ejecting apparatus, the liquid ejecting apparatus including a liquid ejecting head configured to eject liquid from a nozzle disposed on a nozzle surface;

a first wiping portion that has flexibility and configured to wipe the nozzle surface; and a second wiping portion provided separately from the first wiping portion and configured to absorb the liquid adhering to the nozzle surface, the control method comprising:

performing a first maintenance operation that wipes the nozzle surface by the first wiping portion, performing a cleaning operation for cleaning the first wiping portion by contacting the first wiping portion and the second wiping portion, and performing a second maintenance operation that wipes the nozzle surface by the second wiping portion.

* * * * *